United States Patent [19]

Miyashita et al.

[11] Patent Number: 5,591,545
[45] Date of Patent: Jan. 7, 1997

[54] CARBON MATERIAL AND METHOD FOR PRODUCING SAME

[75] Inventors: Kohichi Miyashita; Atsushi Demachi; Kenji Sato; Minoru Noguchi; Naohiko Oki, all of Wako, Japan

[73] Assignee: Honda Giken Kogyo Kabushiki Kaisha, Tokyo, Japan

[21] Appl. No.: 347,226

[22] Filed: Nov. 23, 1994

Related U.S. Application Data

[63] Continuation of Ser. No. 75,455, filed as PCT/JP92/01475 Nov. 11, 1992 published as WO93/10566 May 21, 1993, abandoned.

[30] Foreign Application Priority Data

Nov. 20, 1991 [JP] Japan ................. 3-329675
Nov. 20, 1991 [JP] Japan ................. 3-329676
Feb. 28, 1992 [JP] Japan ................. 4-075874

[51] Int. Cl.⁶ .......................................... H01M 4/58
[52] U.S. Cl. ............. 429/218; 423/445 R; 264/29.6
[58] Field of Search ................. 423/445 R; 264/29.6; 429/218

[56] References Cited

U.S. PATENT DOCUMENTS

| | | | |
|---|---|---|---|
| 3,719,452 | 3/1973 | Accountius | 264/29.5 |
| 4,609,540 | 9/1986 | Izumi et al. | 423/447.2 |
| 4,832,881 | 5/1989 | Arnold, Jr. et al. | 423/445 |
| 4,863,814 | 9/1989 | Mohn et al. | 429/194 |
| 4,865,931 | 9/1989 | McCullough, Jr. et al. | 423/447.2 |
| 5,143,709 | 9/1992 | Labes | 423/445 |

FOREIGN PATENT DOCUMENTS

| | | |
|---|---|---|
| 58-500617 | 4/1983 | Japan . |
| 58-93176 | 6/1983 | Japan . |
| 60-20944 | 2/1985 | Japan . |
| 61-163562 | 7/1986 | Japan . |
| 61-277164 | 12/1986 | Japan . |
| 63-10621 | 1/1988 | Japan . |
| 282466 | 3/1990 | Japan . |
| 2082449 | 3/1990 | Japan . |
| 3176963 | 7/1991 | Japan . |
| 8203637 | 10/1982 | WIPO . |

*Primary Examiner*—Michael Lewis
*Assistant Examiner*—Stuart L. Hendrickson
*Attorney, Agent, or Firm*—Birch, Stewart, Kolasch & Birch, LLP

[57] ABSTRACT

An organic polymer compound such as poly(p-phenylene) is heat treated under an atmosphere of an inert gas such as argon at 500° to 1,500° C., preferably in the vicinity of a carbonization temperature (the range from the carbonization temperature to the carbonization temperature+300° C.) to obtain a carbon material having properties of both a carbon substance and an organic substance.

6 Claims, 22 Drawing Sheets

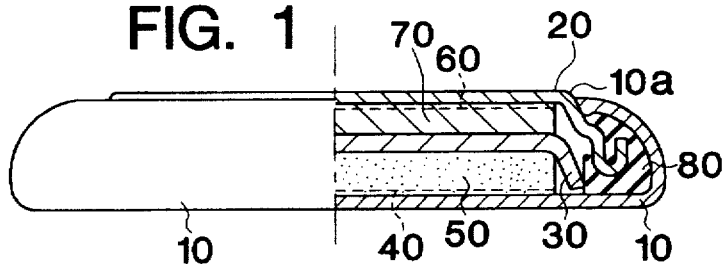
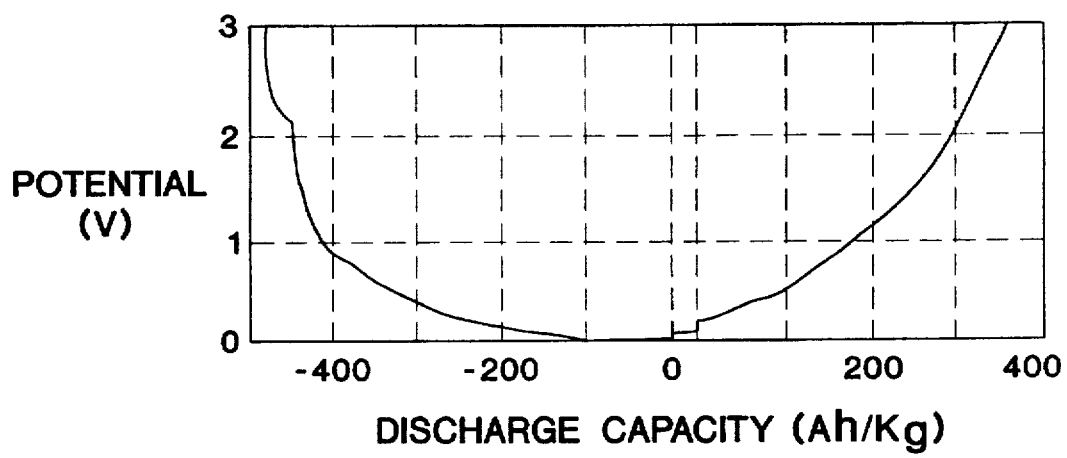
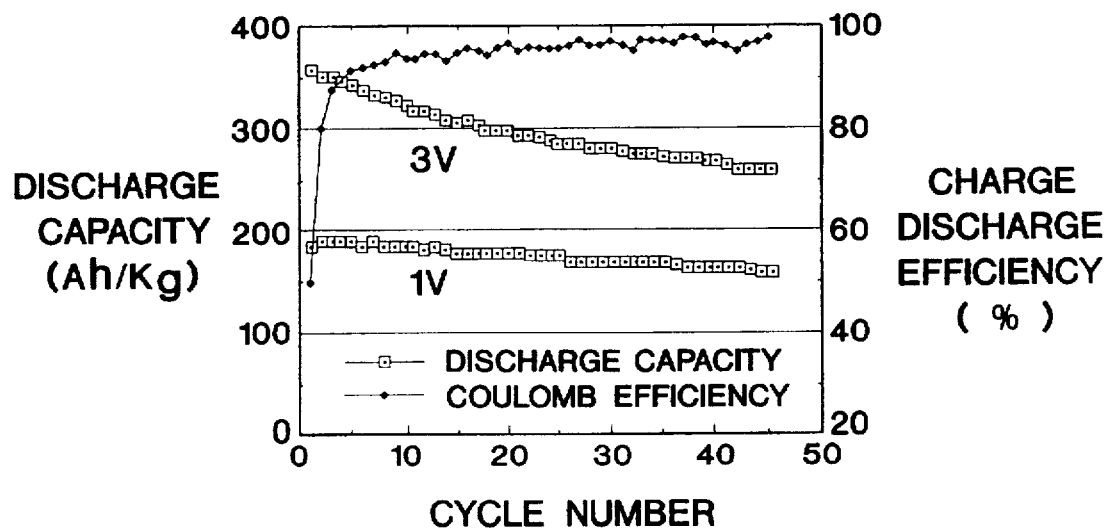

——— FIRST CYCLE
——— SECOND CYCLE
·········· THIRD CYCLE

CARBON MATERIAL AND METHOD FOR PRODUCING SAME

This application is a continuation of application Ser. No. 08/075,455, filed as PCT/JP92/01475 Nov. 11, 1992 published as WO93/10566 May 21, 1993, now abandoned.

TECHNICAL FIELD

The present invention relates to a carbon material, particularly an electrode material for a secondary battery, more particularly an electrode material for a nonaqueous electrolyte secondary battery, and a method for producing the same.

BACKGROUND ART

In recent years, as miniaturization of electronic devices has proceeded, it has been desired to increase the energy density of batteries, and various nonaqueous electrolyte batteries have been proposed.

For example, previously, metallic lithium has been used mainly for primary batteries as anodes for nonaqueous electrolyte batteries, and anodes of lithium alloys represented by aluminum/lithium alloys and carbon anodes have also been known.

However, when used as anodes for secondary batteries, metallic lithium has been known to be inferior in cycle stability due to formation of dendrites, etc.

Further, the anodes of the lithium alloys represented by the aluminum/lithium alloys do not extract full performance from the lithium batteries, although an improvement in cycle stability is observed compared with metallic lithium.

For solving such problems, it has also been proposed to use carbon anodes utilizing the fact that carbon intercalation compounds of lithium are electrochemically easily formed. Such carbon anodes include various ones. For example, a carbon material obtained by burning crystalline cellulose in a stream of a nitrogen gas at 1,800° C. (Japanese Patent Unexamined Publication No. 3-176963), one obtained by graphitization treatment of coal pitch or petroleum pitch under an inert atmosphere at 2,500° C. or more (Japanese Patent Unexamined Publication No. 2-82466) and one proceeding in graphitization treated at a high temperature exceeding 2,000° C. are used, and provide anodes having a cycle stability, though a reduction in capacity is observed compared with metallic lithium and the lithium alloys. However for such anodes, a sufficient cycle stability has not been obtained in charge and discharge at a high current density.

When metallic lithium is used as the anodes of the lithium batteries, dendrites are formed upon charge and discharge. They not only cause deterioration, but also react with violence by contact with water, which raises the problem that the possibility of deterioration increases. Also, the lithium alloys are known not to be sufficient, although superior to metallic lithium in stability.

On the other hand, carbon anodes are sufficiently gentle in reaction with water also in the charged state, the state where lithium is intercalated in carbon, and the formation of dendrites upon charge and discharge is also barely observed. They are therefore excellent. However, many kinds of carbons can scarcely be charged and discharged, or are extremely low in capacity, compared with the theoretical capacity (assuming that the state of $LiC_6$ is a maximum capacity).

Further, even if the initial capacity is relatively large, the capacity is deteriorated by repetition of charge and discharge. Even in the carbon anodes having a relatively large capacity, repetition of charge and discharge at a high current density provokes rapid deterioration, and the performance as secondary batteries can not be satisfied. Thus, anodes having adequate performance have not been obtained by the conventional carbon anodes.

Furthermore, for producing carbon for carbon electrodes, heat treatment at a high temperature of 2,000° C. or more is necessary, and a method has been desired in which carbon can be produced at a lower temperature and more easily.

As is described above, carbon has come to be used as optimum electrode materials for secondary batteries, and can also be utilized for semiconductors, capacitors, activated carbon, etc. in addition, to widen its uses.

The present invention was carried out with the background of the conventional technical problems as described above, and an object is to provide a carbon material useful for an electrode material for a secondary battery, a capacitor, activated carbon, etc., particularly which has a high capacity, which is excellent in cycle stability, and which can also comply with charge and discharge at high current density; and a method for producing a carbon material in which such a carbon material can be obtained at a relatively low temperature (1,500° C. or less) without heat treatment at a high temperature.

DISCLOSURE OF INVENTION

The present invention provides a carbon material characterized in that the carbon material is obtained by heat treating an organic polymer compound under an inert gas atmosphere at a temperature of 500° to 1,500° C. and has properties of both a carbon substance and an organic substance, and a method for producing the same.

BRIEF DESCRIPTION OF DRAWINGS

FIG. 1 is a front view partially containing a cross sectional view showing a lithium secondary battery using a carbon material of the present invention as an electrode material for the lithium battery.

FIG. 2 is a graph showing a charge-discharge curve of a lithium battery in Example 1.

FIG. 3 is a graph showing discharge capacity and coulomb efficiency vs. cycle number of the lithium battery in Example 1.

BEST MODES FOR CARRYING OUT THE INVENTION

Figure 4:
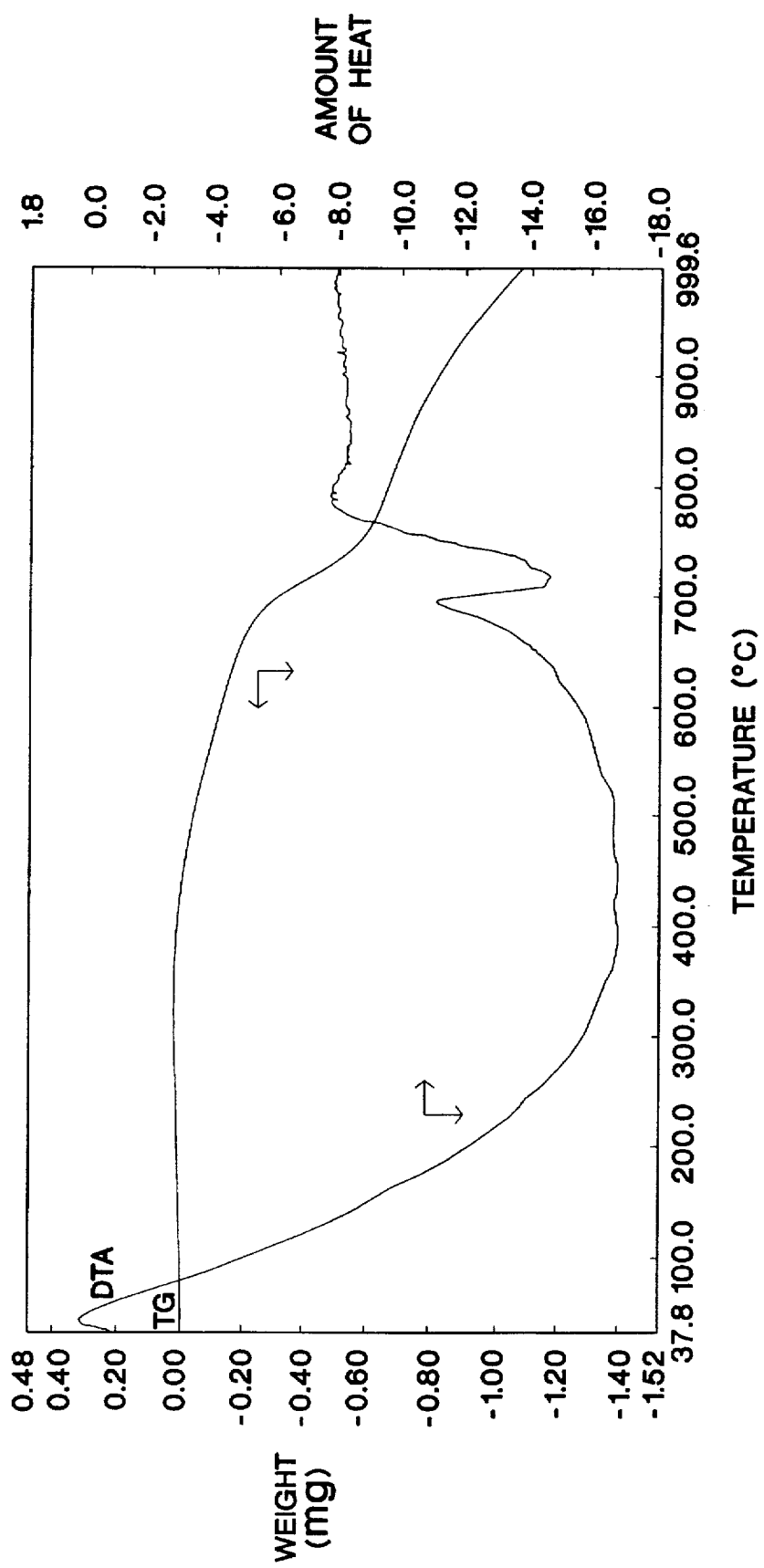
FIG. 4 is a graph showing results of TG and DTA of a carbon material in Example 1.

Carbon is different in properties and crystal structure according to its starting material and manufacturing method, and the use thereof as an electrode for a secondary battery also results in a great difference in performance.

According to the present invention, carbon materials useful for electrode materials for particularly high-performance secondary batteries can be easily obtained by heat treatment of organic polymer compounds at 500° to 1,500° C. which is not so high a temperature as in the prior art.

In the present invention, the temperature of heat treatment is 500° to 1,500° C. If it is less than 500° C., carbonization does not proceed. On the other hand, if it exceeds 1,500° C., graphitization proceeds too much, which results in a reduction in capacity of the battery. Partially graphitized amorphous carbon which is characterized by its X-ray diffraction pattern is obtained by heat treating the organic polymer compound at 500° to 1,500° C., and in this state, organic components, namely elements (usually hydrogen) other than carbon contained in the starting material remain, which are optimum as the electrode material for the lithium battery.

The carbon materials of the present invention thus obtained satisfy the following conditions (1) to (6), and have both properties of an carbon substance and an organic substance.

(1) The density is 1.3 to 2.1 $g/cm^3$.

(2) The hydrogen/carbon (H/C) atomic ratio is 0.05 to 0.6.

(3) They have an amorphous structure which exhibits no particular diffraction peak by X-ray wide angle diffraction.

(4) In Raman spectrum analysis using an argon ion laser beam having a wavelength of 5,145 Å, peaks are exhibited in the vicinities of 1,350 $cm^{-1}$ and 1,600 $cm^{-1}$, and no clear peak is exhibited in the vicinity of 2,700 $cm^{-1}$.

(5) In $^{13}C$ NMR analysis, a peak is exhibited in the vicinity of 120 to 130 ppm arising from aromatic cyclocondensation.

(6) They have electrical conductivity, and the resistivity at room temperature is $10^{-3}$ to $10^4$ $\Omega cm$.

In the carbon materials of the present invention, the density is 1.3 to 2.1 $g/cm^3$, and preferably 1.9 to 2.1 $g/cm^3$. A density of less than 1.3 $g/cm^3$ provides a reduction in discharge capacity, whereas a density exceeding 2.1 $g/cm^3$ gives a decrease in cycle stability. Here, the density is density of the portion excluding voids of a porous solid.

Further, the carbon materials of the present invention have a hydrogen/carbon (H/C) atomic ratio of 0.05 to 0.6, preferably 0.15 to 0.40. If the hydrogen/carbon (H/C) ratio is less than 0.05, the graphite structure is developed and the crystal structure is destroyed by expansion and contraction of crystals upon doping-dedoping reaction of lithium, corresponding to charge and discharge, which results in deterioration of cycle stability. On the other hand, a ratio exceeding 0.6 markedly decreases discharge capacity.

Furthermore, the carbon materials of the present invention exhibit no particular diffraction peak by X-ray wide angle diffraction. A carbon material exhibiting a particular diffraction peak is developed in graphite structure rather than amorphous structure, so that the cycle stability is lowered.

Moreover, the carbon materials of the present invention exhibit peaks in the vicinities of 1,350 $cm^{-1}$ and 1,600 $cm^{-1}$, and do not exhibit a clear peak in the vicinity of 2,700 $cm^{-1}$, in Raman spectrum analysis using an argon ion laser beam having a wavelength of 5,145 Å, whereas in the case of graphite, there are sharp peaks around 1,580 $cm^{-1}$ and 2,700 $cm^{-1}$. Since such a material is graphite, the cycle stability is also lowered. In the carbon materials of the present invention, it is preferred that the spread and overlap of graphite layers are not allowed to develop so much and the size of a crystallite in the a-axis direction is 25 Å or less. In this manner, the structure destruction is reduced because of the small graphite structure, and thus the cycle stability is improved.

Still further, in NMR analysis, each of the carbon materials of the present invention has a peak in the vicinity of 120 to 130 ppm arising from aromatic cyclocondensation, when an external standard of adamantane is used in which a peak on a higher magnetic field is 29.5 ppm in $^{13}C$ NMR according to the CPMAS method.

In addition, the carbon materials of the present invention have electrical conductivity, and the resistivity at room temperature is $10^{-3}$ to $10^4$ $\Omega cm$. In carbon materials having a resistivity within this range, carbonization does not fully proceed, and the properties of the organic substances of the starting materials remain, which have the property of being able to absorb the expansion and contraction of crystals upon doping-dedoping reaction of lithium corresponding, to charge and discharge, whereby the structure thereof is not destroyed. If the resistivity is less than $10^{-3}$ $\Omega$cm, the graphite structure is developed and the structure thereof is destroyed by the expansion and contraction of crystals upon doping-dedoping reaction of lithium, corresponding to charge and discharge, which results in deterioration of cycle stability. On the other hand, if the resistivity is more than $10^4$ $\Omega$cm, polarization upon charge-discharge reaction is increased. The resistivity is preferably 0.1 to $10^3$ $\Omega$cm.

The carbon materials of the present invention satisfying the conditions (1) to (6) as described above have some properties of carbon materials of having corrosion resistance, a high surface area because of being porous, and lubricity because of fine particles. They are substances having both the properties of carbon substances, such that the doping-dedoping reaction of lithium corresponding to charge and discharge is possible and the properties of organic substances, such that the expansion and contraction of crystals corresponding to it can be absorbed, and excellent in cycle stability and greatly excellent also in discharge capacity.

Methods for producing the carbon materials of the present invention are hereinafter described. The carbon materials of the present invention are usually obtained by heat treatment of organic polymer compounds in a stream of an inert gas such as argon, helium, nitrogen, etc. at 500° to 1,500° C., preferably in the vicinities of carbonization temperatures of the organic polymer compounds. The carbonization temperature is a temperature at which elimination of hydrogen, etc. from the organic polymer compound or the starting material occurs, and measured by TG (thermogravimetry) and DTA (differential thermal analysis). This heat treatment temperature varies according to starting materials, and the optimum heat treatment temperature also varies. However, this temperature is preferably within the range of the carbonization temperature to the carbonization temperature +300° C., usually 600° to 1,000° C., and more preferably 600° to 800° C.

The heating time is appropriately 0 to 5 hours, and preferably 0 to 2 hours, wherein the heating time is a time after arrival at an established temperature, namely the heat treatment temperature. Even if this time is 0, the performance as the electrode material is not largely influenced.

As this specific heat treating method, the rate of heating to a weight-decrease-initiating temperature of the starting material in thermal analysis, namely to the carbonization temperature, may be any value. From the weight decrease initiating temperature to a maximum ultimate temperature, the temperature is usually raised at a rate of heating of 6° to 300° C./hour, and preferably at a rate of heating of 20° to 200° C. More preferably, the rate is 20° to 100° C. Here, the maximum ultimate temperature is a temperature at which a 10 to 90% decrease in weight occurs when the weight decrease between the weight-decrease-initiation temperature and a weight-decrease-termination temperature is taken as 100%.

A concrete method of such heat treatment is illustrated by means of the example of poly(p-phenylene). Namely, the temperature may be raised from room temperature to 500° C. at any rate of heating, and the performance of the carbon material obtained therefrom as the electrode material is not influenced. From 500° C., the temperature is preferably raised at a constant rate of heating, appropriately at 6° to 300° C./hour, preferably at 24° to 120° C./hour, and more preferably at 30° to 60° C./hour.

Although the heat treatment temperature is 500° to 1,500° C. as is described above, it is preferably 600° to 1,200° C., and more preferably 700° to 1,000° C.

The heat treatment is carried out in an inert gas such as argon, helium, nitrogen, etc., and this inert gas my be allowed to flow at a flow rate within the range not affecting control of the rate of heating.

Further, for cooling, the temperature may be returned to room temperature in a flow of an inert gas by furnace cooling. Treatment such as heat treatment as after treatment or surface modification is unnecessary.

Here, as the organic compounds used as the starting materials, heat-resistant organic polymer compounds such as polyamides, polyimides, polyesters, polyether-ketones, polybenzyls, polyamideimides and phenol resins are preferred from their molecular structure and properties. Of these organic polymer compounds, non-heterocyclic polymers in which conjugated high-molecular structures are developed are particularly preferred, such as linear type polymers such as poly(p-phenylene) (P. P. P), poly(p-phenylenevinylene) (PPV) and poly(p-phenylenexylene) (PPX) are particularly excellent. Although P. P. P is preferred among others, PPV, PPX, etc. are also preferred because they have aliphatic carbons in their molecules and the aliphatic carbons combine condensed six-membered rings with each other after heat treatment, whereby stress produced upon doping and dedoping is relaxed to improve the cycle characteristic.

The heat-treated compounds thus obtained are usually in a powder or solid form, and mechanically pulverized, whereby the carbon materials particularly excellent and useful as the electrode materials can be obtained.

Conductive fillers can also be added to these carbon materials. The carbon materials of the present invention have properties of both carbon substances and organic substances, and are relatively high in resistance as the electrodes. Namely, the carbon materials of the present invention are excellent in rapid charge-discharge cycles, compared with the carbon electrodes in which a graphite structure is developed. However, when charge and discharge are intended to be conducted at a higher ratio, if the electric resistance of the electrode is high, electrons can not smoothly move in the electrode, when rapid charge or high rate discharge is carried out, which causes a reduction in charge or discharge capacity. The addition of the conductive fillers makes it possible to reduce the electric resistance of the electrode, and further the rapid charge and high rate discharge become possible thereby. As the conductive fillers, metallic powders or meshes may be used, but conductive fillers having lithium ion absorbing-releasing ability such as, for example, vapor-phase growth method carbon fibers are preferred.

When the conductive filler having lithium ion absorbing-releasing ability is used, a reduction in charge-discharge capacity per weight due to addition of the conductive filler can be kept to a minimum. The resistivity of the conductive fillers is within the range of $2.2 \times 10^{-6}$ to $1 \times 10^{-2}$ $\Omega$cm (room temperature), and preferably lower than the carbon materials of the present invention. The amount of the conductive filler added is preferably 1 to 30 parts by weight per 100 parts by weight of carbon material.

When the electrodes are prepared using the carbon materials of the present invention, the particle size of the carbon materials is not necessarily restricted. However, high-performance electrodes can be produced by use of carbon materials having an average particle size of 5 µm or less. In this case, binders such as polyethylene powder are added to these powders and mixed therewith, followed by rolling with rolls. Thus, the electrodes can be produced. The amount of the binder compounded is 2 to 30 parts by weight per 100 parts by weight of carbon material, and preferably 5 to 20 parts by weight.

Here, as the binders, either organic or inorganic binders can be used. As the organic binders, a number of binders such as fluorine resins such as polytetrafluoroethylene, polyvinyl alcohol and polyvinyl chloride can be used.

Further, petroleum pitch and coal pitch can also be used as the binders. In this case, heat treatment in the vicinities of their carbonization temperatures is required.

Furthermore, as the inorganic binders, silicon binders such as silicon glass can be used. Also in this case, heat treatment at a temperature exceeding a melting point is required to allow them to exhibit the performance as the binders.

In this case, the organic compounds or the starting materials are mixed with these binders, subjected to molding, and heat treated as described above, whereby the electrode bodies can be directly obtained. In this case, it is necessary to give attention to changes in shape of the electrode bodies. However, the performance as electrodes for the lithium batteries is equivalent to that of ones obtained by powder compression molding of the carbon materials of the present invention and polyethylene.

The electrode bodies thus obtained are allowed to carry lithium or alkaline metals mainly composed of lithium to be able to use them as the electrodes for the lithium batteries.

Methods for allowing to carry include any methods which have previously been employed, such as thermal diffusion by contact with lithium foil, electrochemical doping of lithium in lithium salt solutions, and diffusion of lithium in carbon by immersion in molten lithium.

The carbon materials of the present invention can be widely used as the anodes of the lithium batteries, and can be used in combination with various cathodes, for example, cathodes using oxides such as manganese dioxide and vanadium pentaoxide or organic polymers such as polypyrrole.

Further, they can be used not only as the anodes, but also as cathodes in a similar manner, in combination with various anodes, for example, electrode materials such as metallic Li, Li alloys and Li—GIC which have a lower potential than the carbon materials of the present invention.

As nonaqueous electrolytes used in the batteries in which the carbon materials of the present invention are used as the electrode materials, any may be employed as long as the nonaqueous substances are chemically stable to cathode materials and anode materials, and lithium ions can move therein to conduct electrochemical reaction with active cathode substances. In particular, compounds composed of combinations of cations and anions are used. The cations include $Li^+$, and examples of the anions include halide anions of the group Va elements such as $PF_6^-$, $AsF_6^-$ and $SbF_6^-$; halogen anions such as $I^-$, $I_3^-$, $Br^-$ and $Cl^-$; perchlorate anions such as $ClO_4^-$; and anions such as $HF_2^-$, $CF_3SO_3^-$ and $SCN^-$. However, they are not necessarily limited to these anions.

Specific examples of the electrolytes having such cations and anions include $LiPF_6$, $LiAsF_6$, $LiSbF_6$, $LiBF_4$, $LiClO_4$, $LiI$, $LiBr$, $LiCl$, $LiAlCl_4$, $LiHF_2$, $LiSCN$ and $LiCF_3SO_3$. Of these, $LiPF_6$, $LiAsF_6$, $LiSbF_6$, $LiBF_4$, $LiClO_4$ and $LiCF_3SO_3$ are particularly preferred.

The nonaqueous electrolytes are usually used in the state where they are dissolved in solvents. In this case, there is no particular limitation on the solvents. However, the solvents having a relatively large polarity are favorably used. Specifically, they include propylene carbonate, ethylene carbonate, tetrahydrofuran, 2-methyltetrahydrofuran, dioxolane, dioxane, ethylene glycol dimethyl ether, glymes such as diethylene glycol dimethyl ether, lactones such as γ-butylolactone, phosphates such as triethyl phosphate, borates such as triethyl borate, sulfur compounds such as sulfolane and dimethyl sulfoxide, nitriles such as acetonitrile, amides such as dimethylformamide and dimethylacetamide, dimethyl sulfate, nitromethane, nitrobenzene and dichloroethane, which may be used alone or as mixtures of at least two kinds of them. Of these, one or a mixture of at least two kinds of them selected from propylene carbonate, ethylene carbonate, butylene carbonate, tetrahydrofuran, 2-methyltetrahydrofuran, dioxane, ethylene glycol dimethyl ether, dioxolane and γ-butylolactone is particularly preferred.

Further, as these nonaqueous electrolytes, there can be used organic solid electrolytes in which polymers such as polyethylene oxide, polypropylene oxide, polyethylene oxide cross-linked with isocyanates and phosphazene polymers having ethylene oxide oligomers as side chains are impregnated with the above-mentioned nonaqueous electrolytes; and inorganic solid electrolytes such as inorganic ion derivatives such as $Li_3N$ and $LiBCl_4$, and lithium glass such as $Li_4SiO_4$ and $Li_3BO_3$.

The lithium secondary battery using the carbon material of the present invention as the electrode material will be described in more detail with reference to the drawing.

Namely, in the lithium secondary battery using the carbon material of the present invention in the anode, as shown in FIG. 1, the inside of a button-shaped cathode case 10 whose opening 10a is sealed with an anode cap 20 is partitioned with a separator 30 having fine perforations, and a cathode 50 having a cathode collector 40 arranged on the side of the cathode case 10 is accommodated in the partitioned space on the cathode side, whereas an anode 70 having an anode collector 60 arranged on the side of the anode cap 20 is accommodated in the space on the anode side.

As the separator 30, one which is porous and through which the electrolytes can be passed or which can contain them, for example, a nonwoven, woven or knitted fabric made of a synthetic resin such as polytetrafluoroethylene, polypropylene or polyethylene, can be used. Further, as the cathode material used for the cathode 50, a burned particle material such as lithium-containing vanadium pentaoxide or lithium-containing manganese dioxide can be used.

The reference numeral 80 designates an insulating packing made of polyethylene which is arranged along the inner surface of the cathode case 10 for supporting the anode cap 20 in an insulated state.

The carbon materials of the present invention comprise the carbon substances and the organic substances as mixtures, and have both the properties of the carbon substances and the organic substances. Then, as the characteristic of the carbon substances, the doping-dedoping reaction of lithium accompanying the charge and discharge is possible. In addition, as the property of the organic substances, they have the property that the expansion and contraction of crystals corresponding to the doping-dedoping of lithium can be absorbed, thereby resulting in excellent cycle stability and also greatly excellent discharge capacity.

Figure 5:
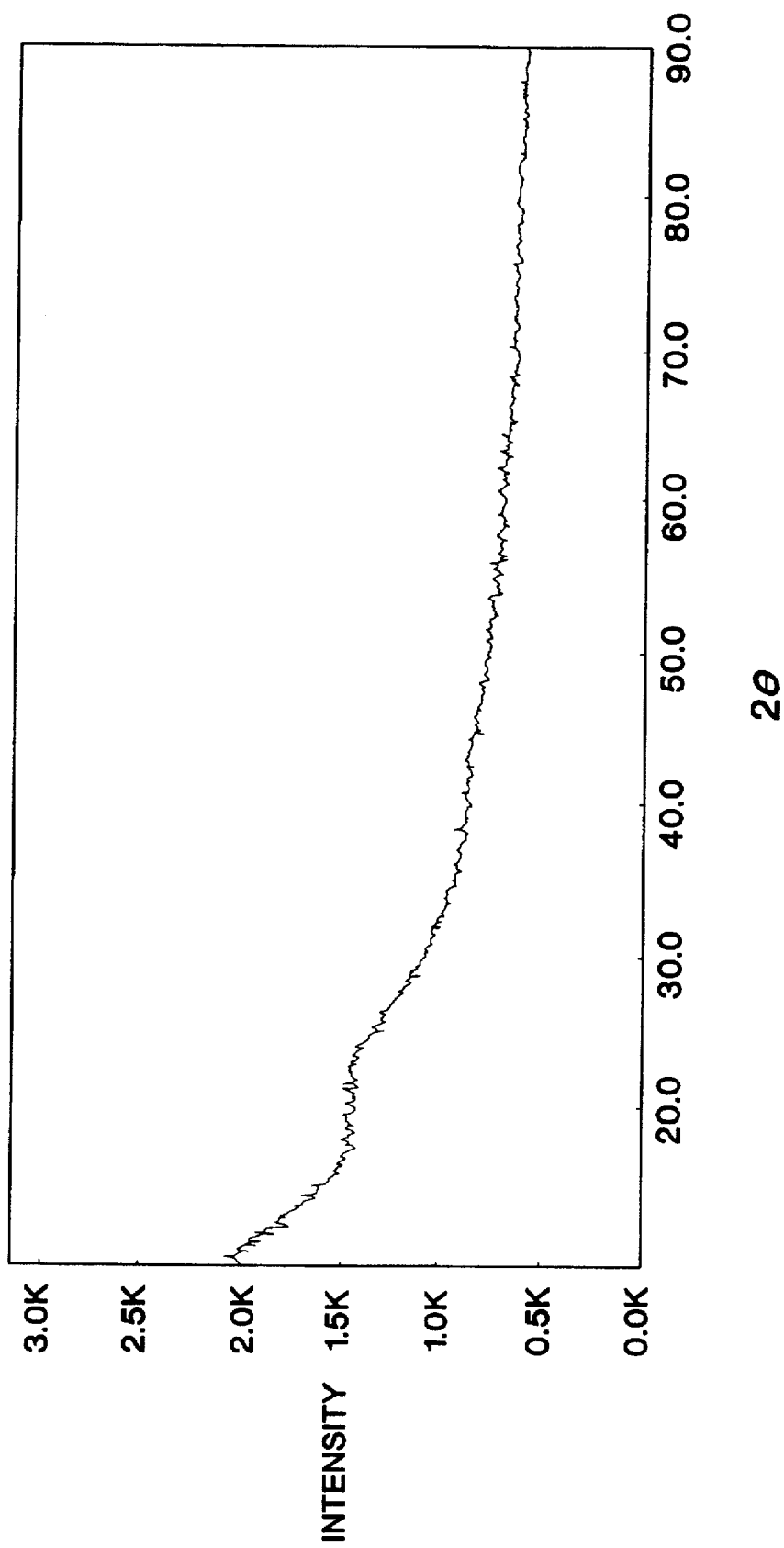
FIG. 5 is an X-ray diffraction pattern of the carbon material in Example 1.

Further, an X-ray diffraction pattern of the carbon material (Example 1) comprising the carbon substance and the organic substance as the mixture is shown in FIG. 5. Although a peak shoulder caused by a condensed aromatic six-membered ring is observed, no diffraction peak is observed. Accordingly, crystallization does not proceed and the carbon material has an amorphous structure. The carbon material of the present invention is heat treated at a relatively low temperature, so that it does not have the firm graphite structure, but has a one-dimensional graphite-analogous structure, being intermediate between graphite and the organic substance.

Like this, in the carbon materials of the present invention, the graphite structure is little developed, and the graphite structure in which lithium diffuses between graphite layers is very small. The diffusion speed of lithium is therefore very high. Further, the area of a contact interface of the solution and the graphite structure is large. For these reasons, it is considered to be able to comply with the charge and discharge at a high current density. On the other hand, when the graphitization proceeds, the intercalation of lithium between the layers is carried out. However, the diffusion speed of lithium in the bulk is restricted. As a result, it is considered not to be able to comply with the charge and discharge at a high current density (high power). Further, in the carbon materials of the present invention, some graphite exists in the carbon. It is therefore presumed that the electric conductivity is elevated thereby to act so as to enhance the performance as the electrodes.

Accordingly, the electrodes for the lithium batteries which have a high capacity, which are excellent in cycle stability upon the charge and discharge, and which can resist the charge and discharge at a high current density can be obtained by using the carbon materials of the present invention having the properties of both the carbon substances and the organic substances as the electrode materials of the secondary batteries, particularly the lithium batteries.

The present invention is hereinafter described in more detail with reference to examples, but it is not limited to these examples.

Example 1

Poly(p-phenylene) (P. P. P) represented by the following general formula (I) was heat treated in an argon atmosphere at 700° C. to obtain a carbon material in which about 98% by weight of a carbon component and about 1.5% by weight of an organic component (H) exist as a mixture.

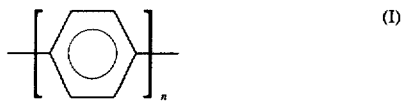

wherein n represents a polymerization degree.

As a binder, a powder of Teflon (manufactured by du Pont, polytetrafluoroethylene) was added thereto so as to give 10% by weight, followed by powder compression molding to produce an anode.

Using the prepared electrode as an anode, lithium foil as a counter electrode, and a solution as an electrolyte, in which 1 mol/l of $LiClO_4$ was dissolved in a mixed solvent of PC (propylene carbonate) and ethylene glycol dimethyl ether in a volume ratio of 1:1, the battery shown in FIG. 1 was prepared and the performance was evaluated.

A charge-discharge curve thereof is shown in FIG. 2, and the plots of discharge capacity and coulomb efficiency vs. cycle number are shown in FIG. 3. The initial capacity exhibits a value exceeding 350 Ah/kg, and the discharge capacity is stable though gradually lowered. The cause of this lowering is considered to be attributed to a side reaction product on the lithium foil used as the counter electrode [the existence of the side reaction product in the electrolyte solution was confirmed by HPLC (liquid chromatography) analysis]. As is described above, the anode for the lithium battery having a high capacity, a high power output and a high stability can be produced by use of the carbon material obtained by heat treatment of the organic high-molecular compound in the vicinity of the carbonization temperature.

Results of TG and DTA are shown in FIG. 4. These results reveal that the useful carbon material as the anode of lithium battery in which the desired component and the organic component exist as the mixture is obtained by heat treatment at about 700° C.

Further, in FIG. 5, an X-ray diffraction pattern of the carbon material of the present invention obtained by heat treatment is shown. This reveals that the resulting carbon material is nearly amorphous and carbon does not indicate the firm crystal structure.

Example 2

An experiment was conducted in a manner similar to that of Example 1, with the exception that poly(p-phenylenexylene) represented by the following general formula (II) was substituted for P. P. P.

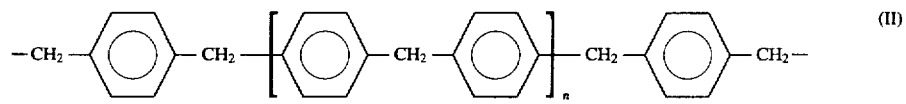

wherein n represents a polymerization degree.

Figure 6:
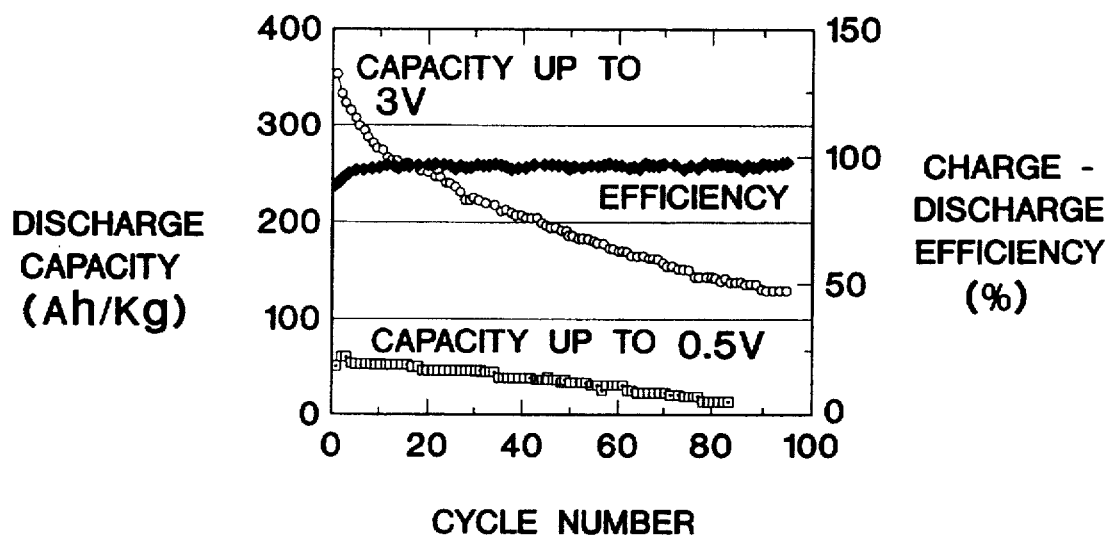
FIG. 6 is a graph showing discharge capacity and coulomb efficiency vs. cycle number of a lithium battery in Example 2.

A charge-discharge curve was similar to FIG. 2 of Example 1. Further, the plots of discharge capacity and coulomb efficiency vs. cycle number were as shown in FIG. 6.

Comparative Example 1

A battery was prepared in a manner similar to that of Example 1, with the exception that commercial anode carbon for a lithium battery was used in an anode, and the performance was evaluated.

Figure 7:
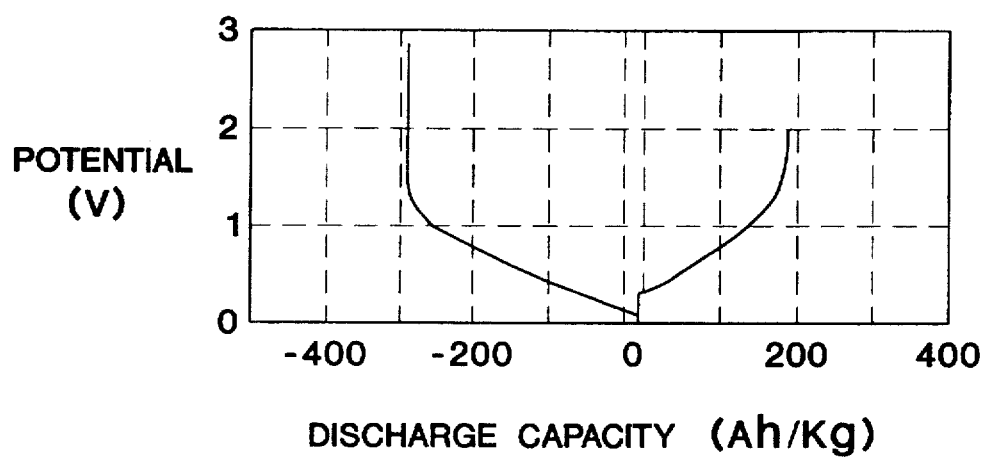
FIG. 7 is a graph showing a charge-discharge curve of a lithium battery in Comparative Example 1.
Figure 8:
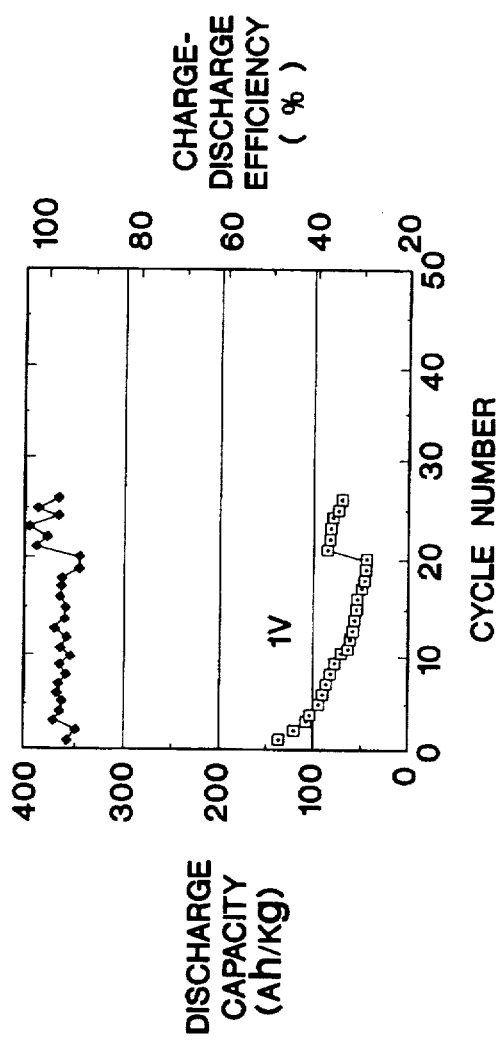
FIG. 8 is a graph showing discharge capacity and coulomb efficiency vs. cycle number of the lithium battery in Comparative Example 1.

A charge-discharge curve is shown in FIG. 7, and the plots of discharge capacity and coulomb efficiency vs. cycle number are shown in FIG. 8. These reveal that both the capacity and the cycle stability are low, compared with Examples 1 and 2.

Figure 9:
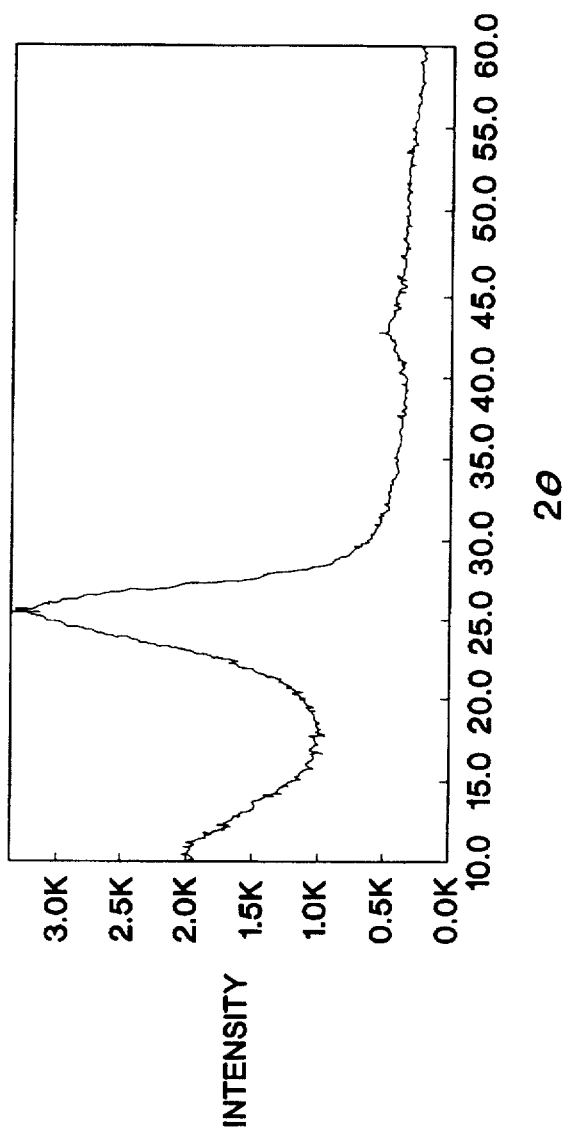
FIG. 9 is an X-ray diffraction pattern of commercial anode carbon in Comparative Example 1.

In FIG. 9, an X-ray diffraction pattern of the anode carbon used in this Comparative Example is shown. This reveals that this carbon has the crystal structure of graphite.

Example 3

Poly(p-phenylene) represented by the above-mentioned general formula (I) which was synthesized using benzene as a starting material was heat treated in an argon atmosphere to obtain a carbon material.

Figure 10:
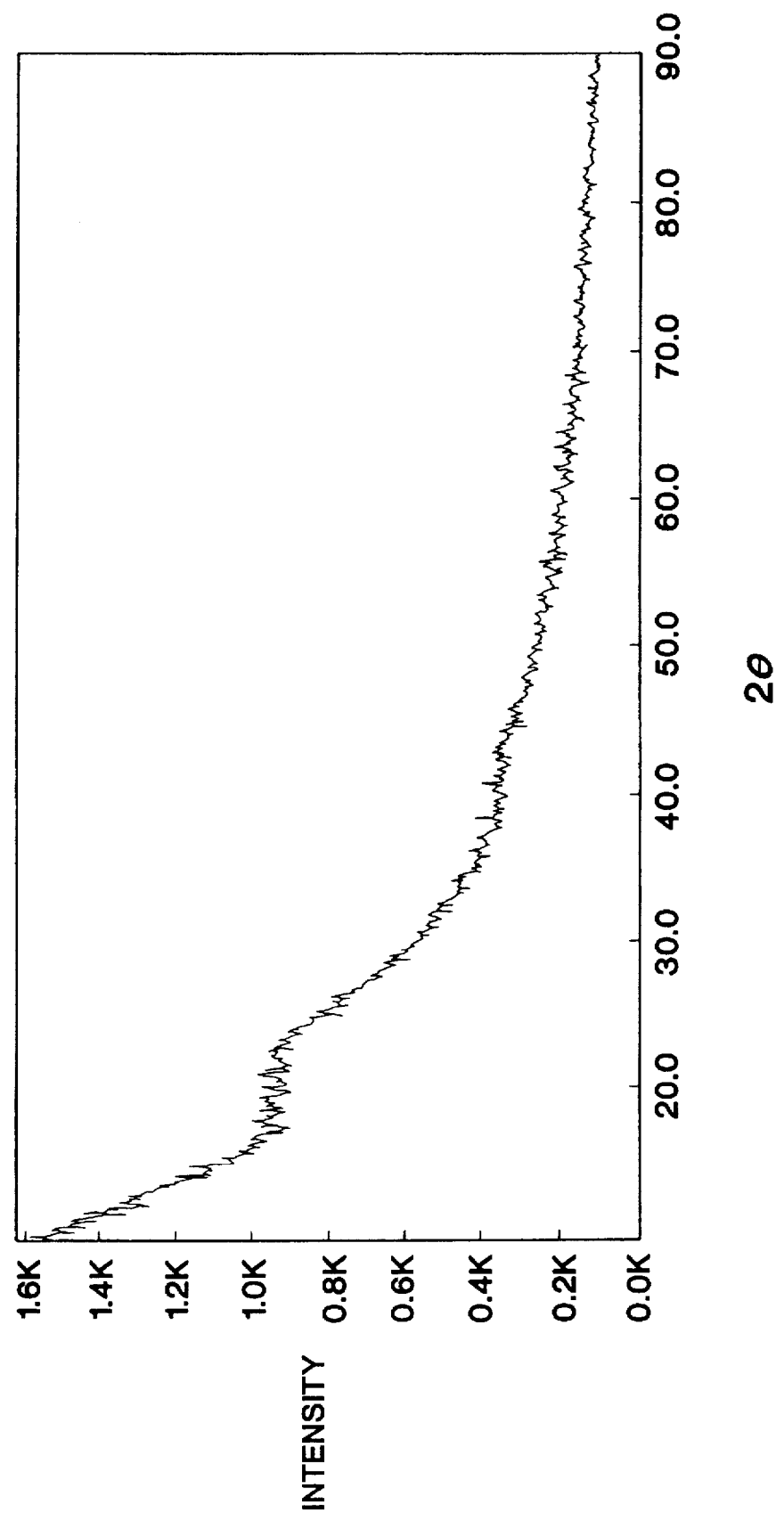
FIG. 10 shows X-ray diffraction patterns of carbon materials obtained in Examples 3 and 7.

In this heat treatment, the temperature was raised from room temperature to 500° C. for 1 hour, and raised form 500° to 700° C. for 5 hours. The retention time at 700° C. was 0 minute, followed by furnace cooling by allowing to stand in an argon flow. An X-ray diffraction pattern of the carbon material thus produced is shown in FIG. 10.

As a binder, a powder of Teflon (manufactured by du Pont, polytetrafluoroethylene) was added to the carbon material thus obtained so as to give 10% by weight, followed by powder compression molding to produce an anode.

Combining the prepared anode with a counter electrode (lithium) and a reference electrode (lithium), and using a solution as an electrolyte, in which 1 mol/l of $LiClO_4$ was dissolved in a mixed solvent of propylene carbonate and ethylene glycol dimethyl ether in a volume ratio of 1:1, the performance was evaluated.

Figure 11:
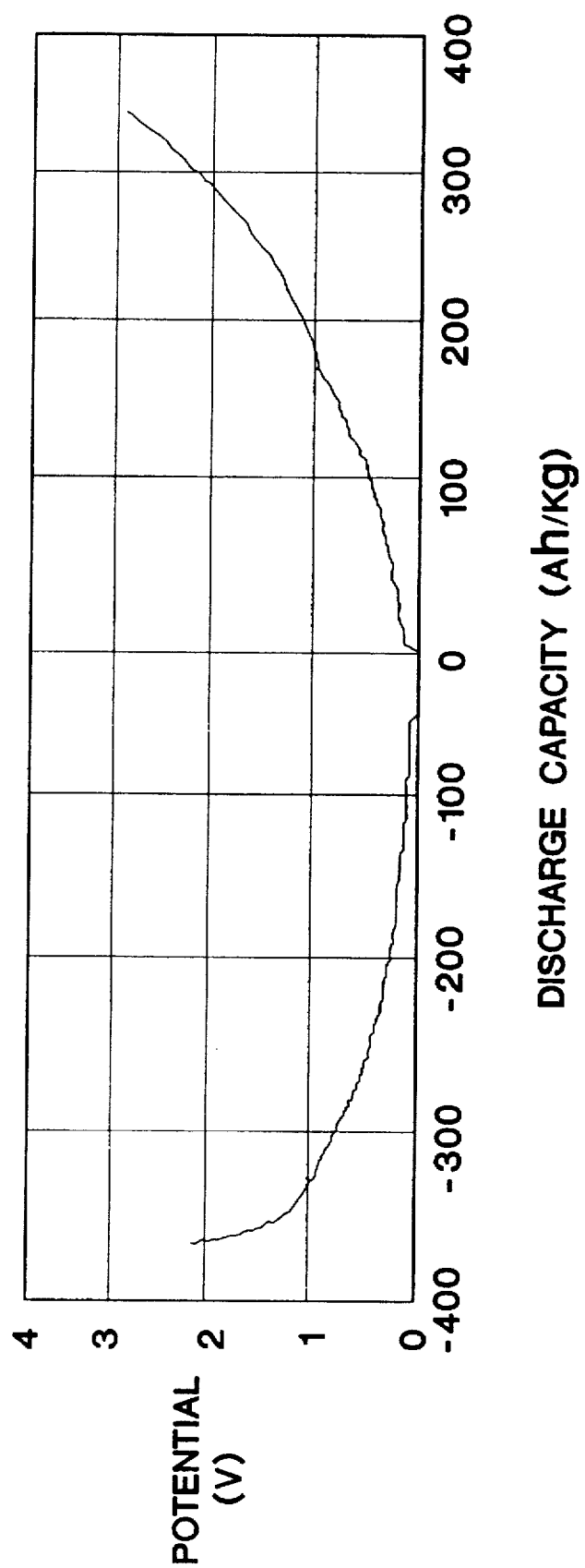
FIG. 11 is a graph showing a charge-discharge curve in Example 3.

As a result, the initial capacity was as high as 357 Ah/kg, and the cycle stability was excellent. Although the charge-discharge current at this time was as extremely high as 1.6 mA/cm, a stable charge-discharge curve was indicated as is shown in FIG. 11.

Figure 12:
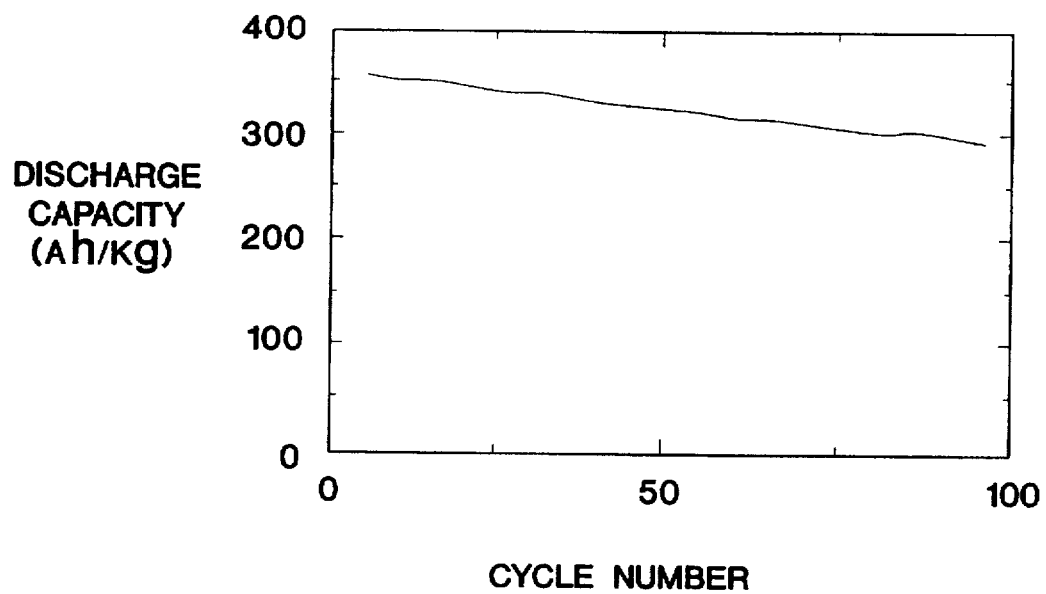
FIG. 12 is a graph showing discharge capacity vs. cycle number in Example 3.

Further, the plots of discharge capacity vs. cycle number are shown in FIG. 12. Although some deterioration is observed, the side reaction of the counter electrode with the electrolyte is considered to be the main cause of this (a side reaction product was detected from the electrolyte).

As is described above, the carbon material obtained by heat treating poly(p-phenylene) as the starting material was high in capacity as the anode for the lithium battery and excellent in cycle stability even at a high current density.

Comparative Example 2

A battery was prepared in a manner similar to that of Example 3, with the exception that commercial anode carbon for a lithium battery was used in an anode, and the performance was evaluated.

Figure 13:
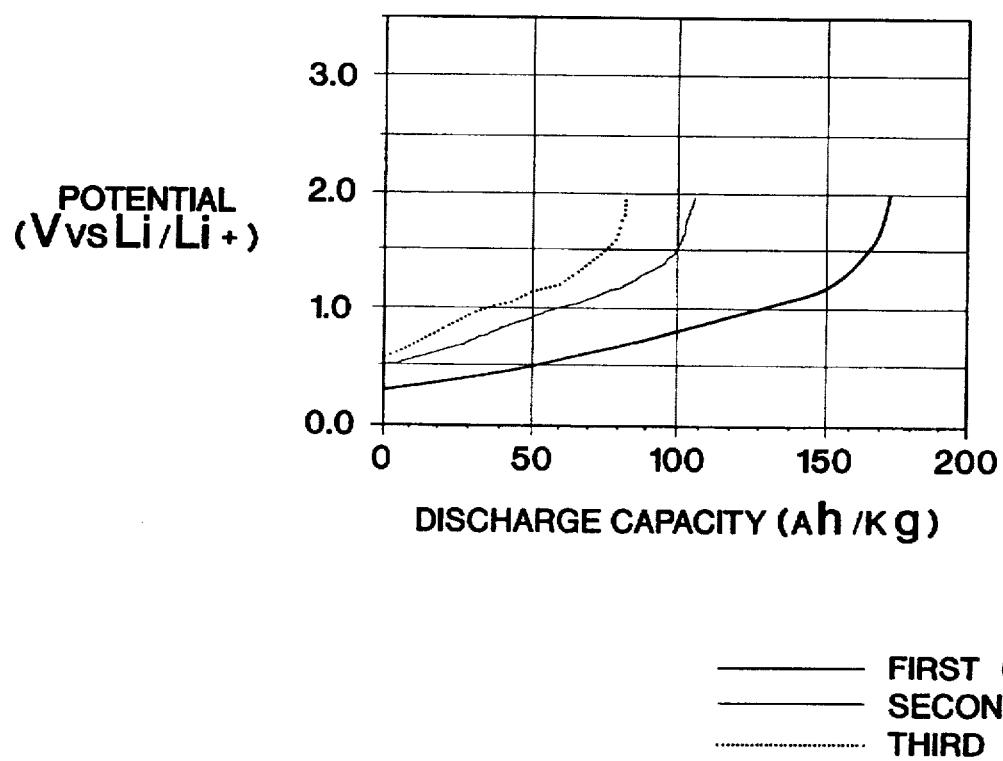
FIG. 13 is a graph showing a charge-discharge curve in Comparative Example 2.

Results are shown in FIG. 13. As is known from FIG. 13, the initial capacity was as low as 173 Ah/kg, and also for the cycle stability, the discharge capacity of the third cycle was lowered to less than 50%, resulting in deteriorated stability.

Examples 4 to 6, Comparative Example 3

Carbon materials were obtained in a manner similar to that of Example 3, and batteries were prepared in a manner similar to that of Example 1, with the exception that poly(p-phenylene) was used as a starting material and the heat treatment temperatures were each varied without controlling the rate of heating. Then, the performance was evaluated. Results are shown in Table 1.

As is apparent from Table 1, Examples 4 to 6 heat treated within the temperature range of the present invention without controlling the rate of heating are a little inferior to Example 3 in which the rate of heating is controlled in performance. On the other hand, in Comparative Example 3 in which the heat treatment temperature is high exceeding the range of the present invention, the initial capacity is particularly low.

TABLE 1

| | Heat Treatment Temperature (°C.) | Results of Evaluation | | | | |
|---|---|---|---|---|---|---|
| | | Initial Capacity (Ah/kg) | | | Deterioration in Discharge Capacity | |
| | | to 0.5 V vs Li | to 1.0 V vs Li | to 2.0 V vs Li | 2nd vs 1st | 3rd vs 1st |
| Example 4 | 1,000 | 55 | 102 | 137 | 98 | 95 |
| Example 5 | 1,300 | 61 | 110 | 141 | 92 | 89 |
| Example 6 | 1,400 | 54 | 95 | 117 | 103 | 103 |
| Comparative Example 3 | 1,950 | 32 | 50 | 64 | 104 | 105 |

Comparative Examples 4 to 11

Carbon materials were obtained in a manner similar to that of Example 3, and batteries were prepared in a manner similar to that of Example 3, with the exception that pitch, nylon and phenol resins (novolak or resol) were used as starting materials and heat treatment was conducted at temperatures shown in Table 2 without controlling the rate of heating. Then, the performance was evaluated. Results are shown in Table 2. As is apparent from Table 2, it is known that poly(p-phenylene) (Example 4) heat treated without controlling the rate of heating has a superiority to the carbon materials in which pitch, nylon and phenol resins were used as the starting materials and heat treated without controlling the rate of heating.

TABLE 2

| | Heat Treatment Temperature (°C.) | Results of Evaluation | | | | |
|---|---|---|---|---|---|---|
| | | Initial Capacity (Ah/kg) | | | Deterioration in Discharge Capacity | |
| | | to 0.5 V vs Li | to 1.0 V vs Li | to 2.0 V vs Li | 2nd vs 1st | 3rd vs 1st |
| Comparative Example 4 (pitch) | 2,400 | 16 | 57 | 79 | 68 | 64 |
| Comparative Example 5 (nylon) | 1,000 | 0 | 9 | 23 | (50) | (0) |
| Comparative Example 6 (novolak, no crosslinking agent added) | 1,000 | 0 | 5.5 | 26 | (50) | (0) |
| Comparative Example 7 (novolak, crosslinking agent added) | 1,000 | 0 | 15 | 84 | 23 | 0 |
| Comparative Example 8 (High-ortho novolak, no crosslinking agent added) | 1,000 | 27 | 71 | 158 | 85 | 45 |
| Comparative Example 9 (High-ortho novolak, crosslinking agent added) | 1,000 | 12 | 52 | 98 | 35 | 15 |
| Comparative Example 10 (resol, no crosslinking agent added) | 1,000 | 33 | 83 | 172 | 74 | 71 |
| Comparative Example 11 (resol, crosslinking agent added) | 1,000 | 23 | 65 | 153 | 86 | 71 |

Example 7

In an argon atmosphere, the temperature of poly(p-phenylene) was raised from room temperature to 500° C. at a rate of heating of 500° C./hour, and from 500° C. to 700° C. at 40° C./hour. At the time when the temperature reaches 700° C., heating was stopped, followed by furnace cooling to room temperature to obtain a carbon material.

Figure 14:
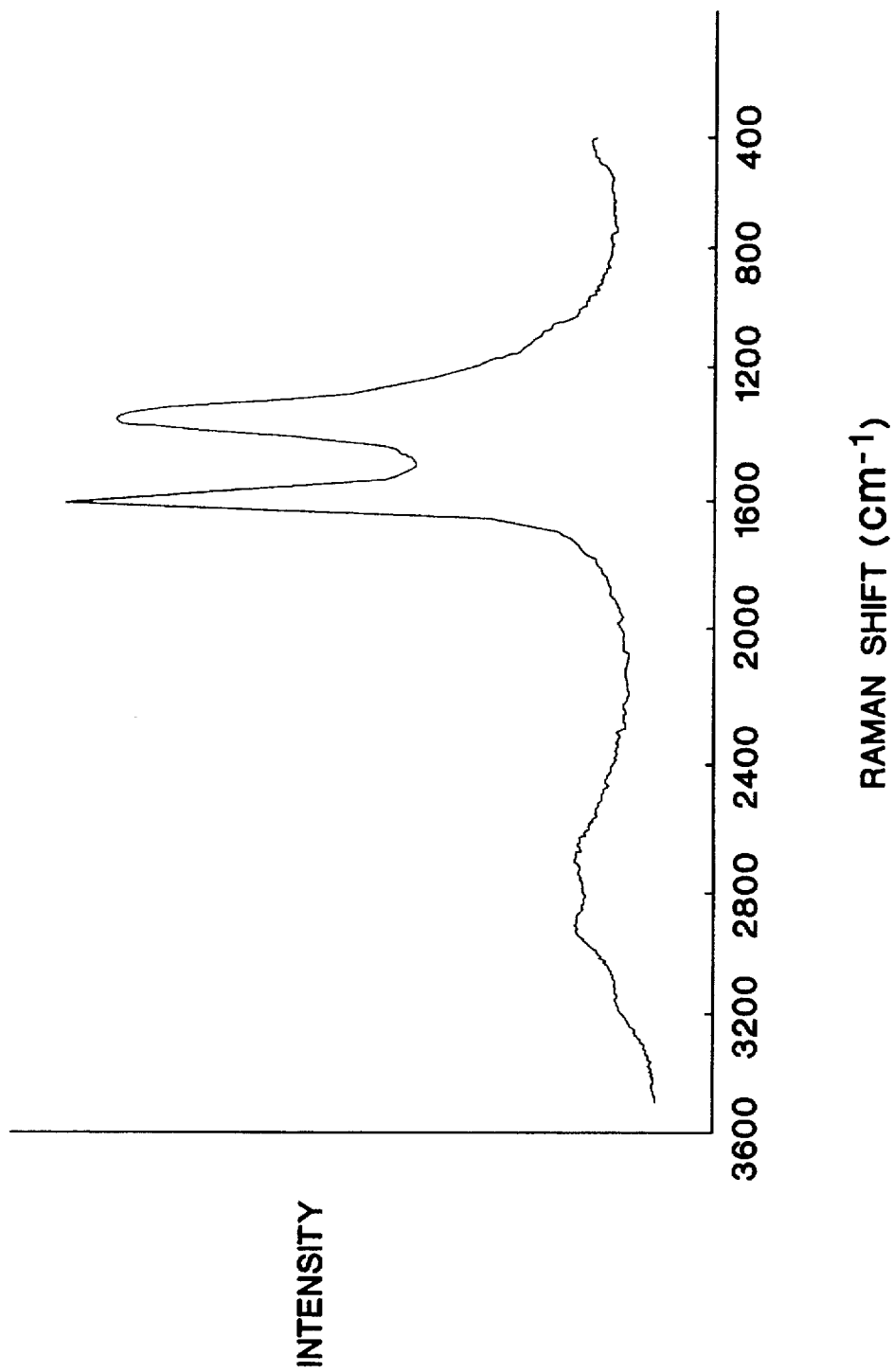
FIG. 14 is a laser Raman spectrogram of a carbon material obtained in Example 7.
Figure 15:
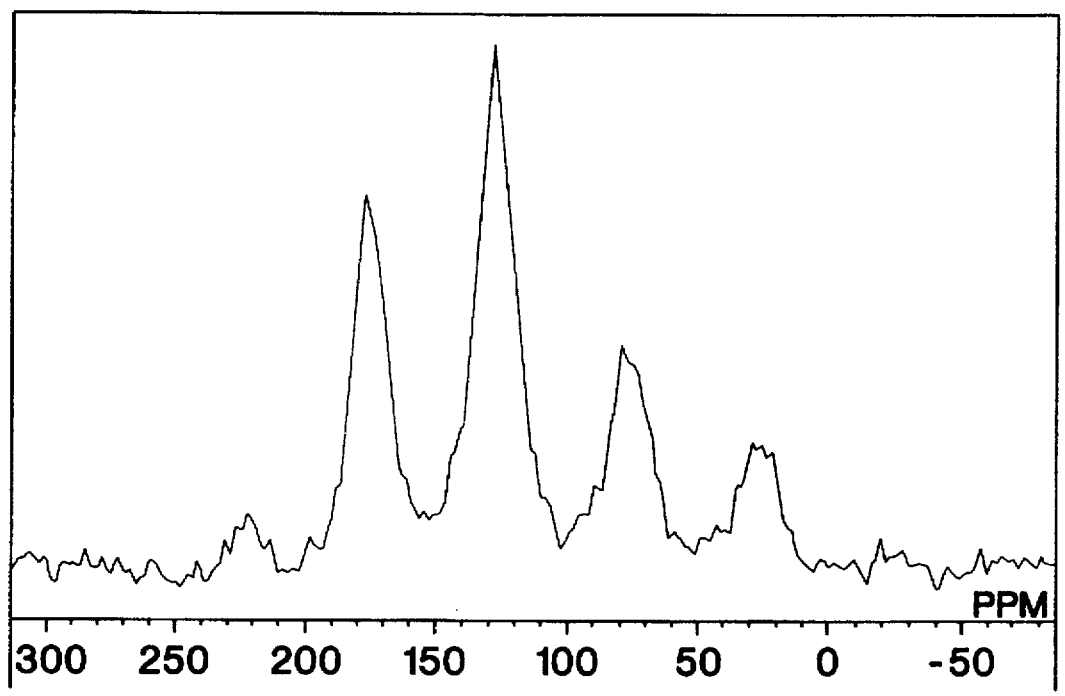
FIG. 15 is an NMR spectrum of the carbon material obtained in Example 7.

An X-ray diffraction pattern of the resulting carbon material is similar to FIG. 10. Further, results of Raman spectrum analysis using an argon ion laser beam having a wavelength of 5,145 Å are shown in FIG. 14, and results of NMR are shown in FIG. 15. The true density was 2.07 g/cm$^3$, hydrogen/carbon (atomic ratio) was 0.199, and the resistivity (conductivity) was $10^{-1}$ to 10 Ωcm.

Ninety percent by weight of a powder of this carbon material was mixed with 10% by weight of polyethylene as a binder, and then rolled through rollers to about 200 μm. After vacuum drying at 80° C., this was cut out to 5×6 mm to produce an anode.

The resistivity of this anode was 40 Ωcm.

Figure 16:
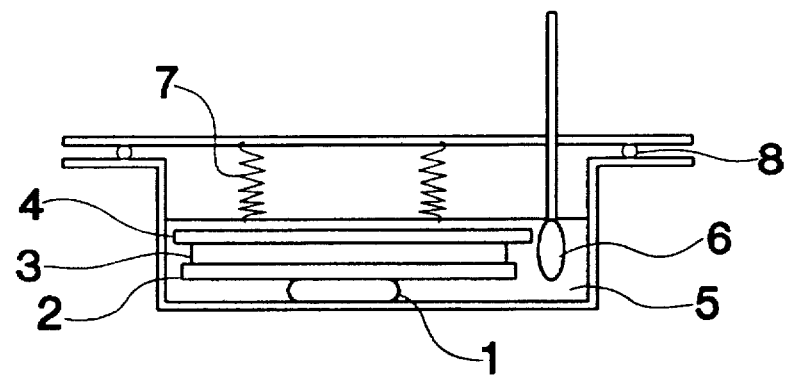
FIG. 16 is a view showing a structure of cells for evaluation.
Figure 17:
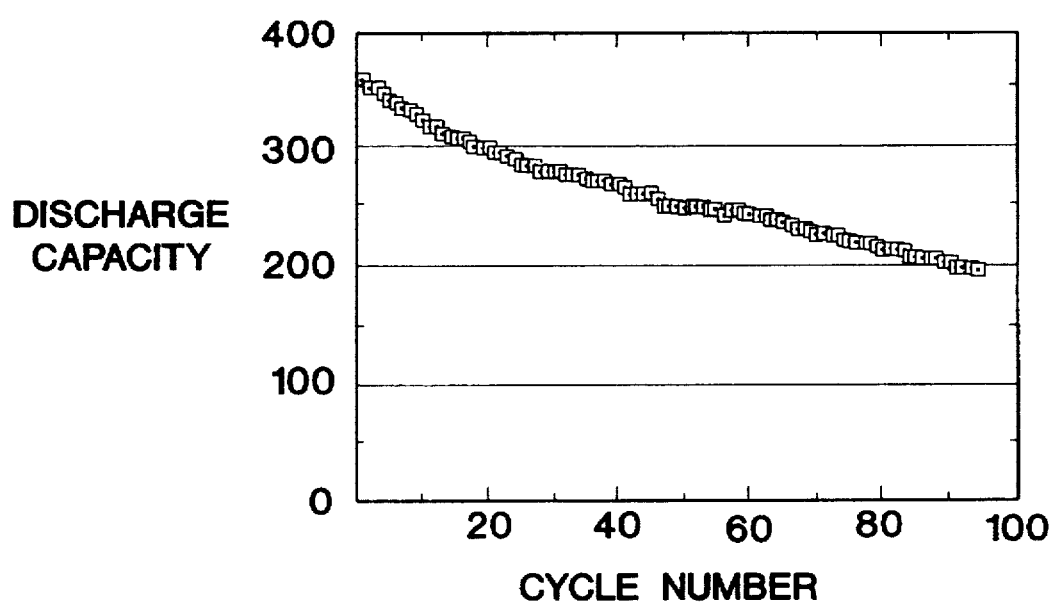
FIG. 17 is a graph showing discharge capacity vs. cycle number in Example 7.

Using the resulting anode, a solution as an electrolyte, in which $LiClO_4$ was dissolved at a concentration of 1 mol/l in a mixed solvent of propylene carbonate and ethylene glycol dimethyl ether in a volume ratio of 1:1, and Li as a counter electrode and a reference electrode, an evaluation cell shown in FIG. 14 was assembled. Using this evaluation cell, the cycle stability was measured under conditions of 3 V discharge termination potential, 0 V charge termination potential and 1.6 mA/cm² charge-discharge current density. Results are shown in FIG. 17.

in FIG. 16, the reference numeral 1 is a sample, the reference numeral 2 is a separator (glass mat), the reference numeral 3 is a counter electrode (Li foil), the reference numeral 4 is a SUS plate, the reference numeral 5 is an electrolyte, the reference numeral 6 is a reference electrode, the reference numeral 7 is a spring, and the reference numeral 8 is an O-ring.

Figure 18:
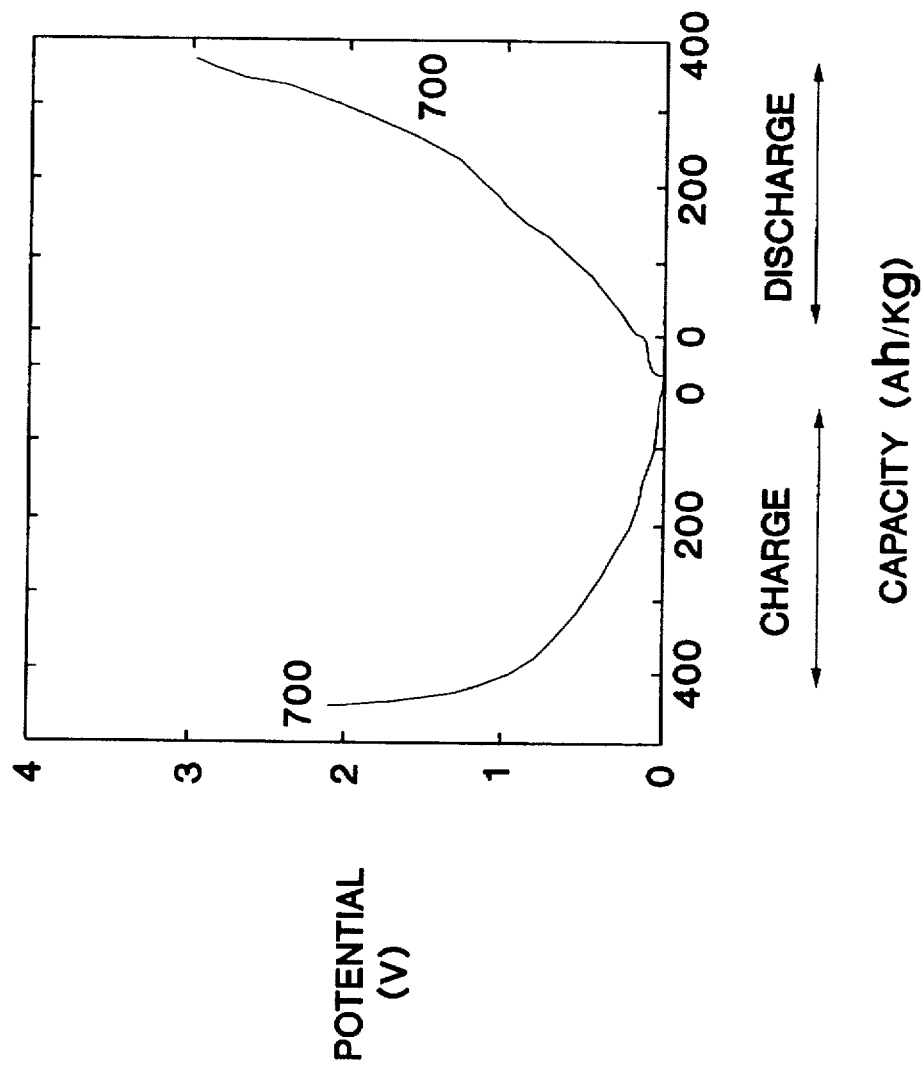
FIG. 18 is a graph showing a charge-discharge curve in Example 7.

Further, results of measurement for the charge-discharge curve of the resulting anode are shown in FIG. 18.

No significant difference was observed between the properties of the sample treated at a rate of heating from 500° to 700° C. of 12° C./hour to 30° C./hour, at a treatment temperature retention time of 0 to 5 hours and the properties of the sample treated under the conditions described herein.

Example 8

A powder of a carbon material was obtained in a manner similar to that of Example 7, with the exception that a polymer of benzene/xylene (molar ratio)=2:1 was used as a starting material.

The true density of this powder was 2.09 g/cm³, and the hydrogen/carbon (H/C) atomic ratio was 0.18. Further, an X-ray diffraction pattern had no particular diffraction peak. In Raman spectrum analysis using an argon ion laser beam having a wavelength of 5,145 Å, the peak of 1,580 cm⁻¹ was shifted to the short wavelength side, and no clear peak was exhibited in the vicinity of 2,700 cm⁻¹.

Figure 19:
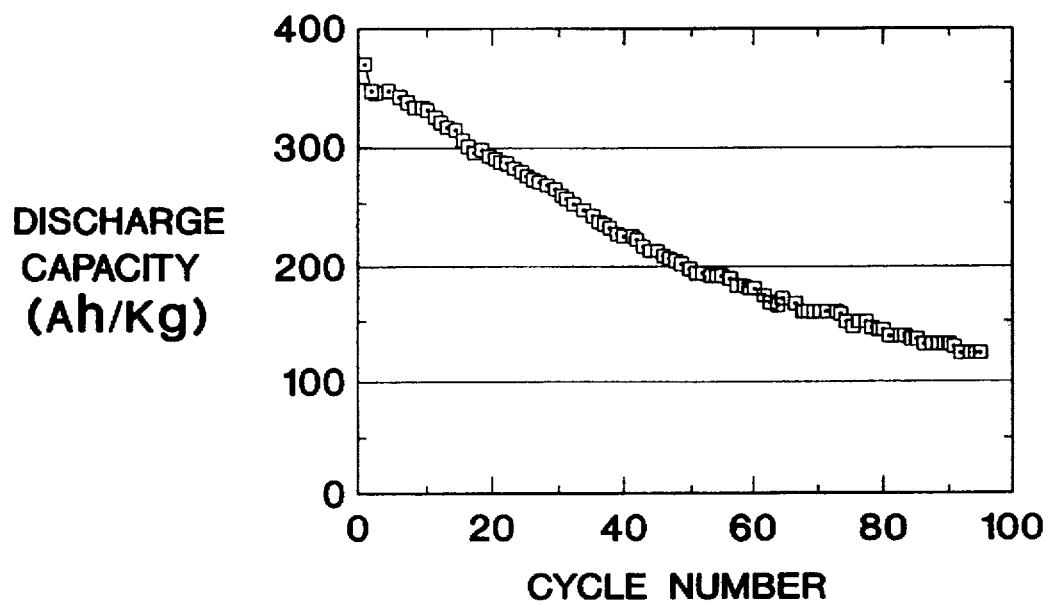
FIG. 19 is a graph showing discharge capacity vs. cycle number in Example 8.

Using this powder, as with Example 7, an anode was produced and an evaluation cell was assembled to evaluate the cycle stability. The resistivity of this electrode was 20 Ωcm. Results are shown in FIG. 19.

Example 9

A powder of a carbon material was obtained in a manner similar to that of Example 7, with the exception that a polymer of benzene/xylene (molar ratio)=1:1 was used as a starting material.

The true density of this powder was 2.09 g/cm³ and the hydrogen/carbon (H/C) atomic ratio was 0.178. Further, an X-ray diffraction pattern had no particular diffraction peak. In Raman spectrum analysis using an argon ion laser beam having a wavelength of 5,145 Å, the peak of 1,580 cm⁻¹ was shifted to the short wavelength side, and no clear peak was exhibited in the vicinity of 2,700 cm⁻¹. The hydrogen/carbon (H/C) atomic ratio was 0.18.

Figure 20:
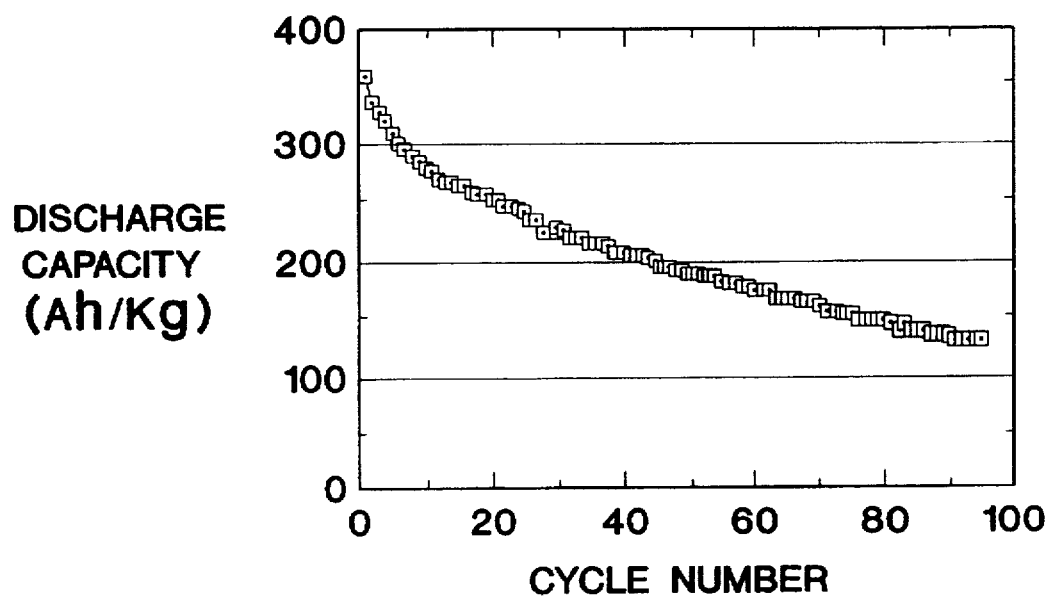
FIG. 20 is a graph showing discharge capacity vs. cycle number of an electrode material obtained in Example 9.

Using this powder, as with Example 7, an anode was produced and an evaluation cell was assembled to evaluate the cycle stability. The resistivity of this electrode was 15 Ωcm. Results are shown in FIG. 20.

Comparative Example 12

Figure 21:
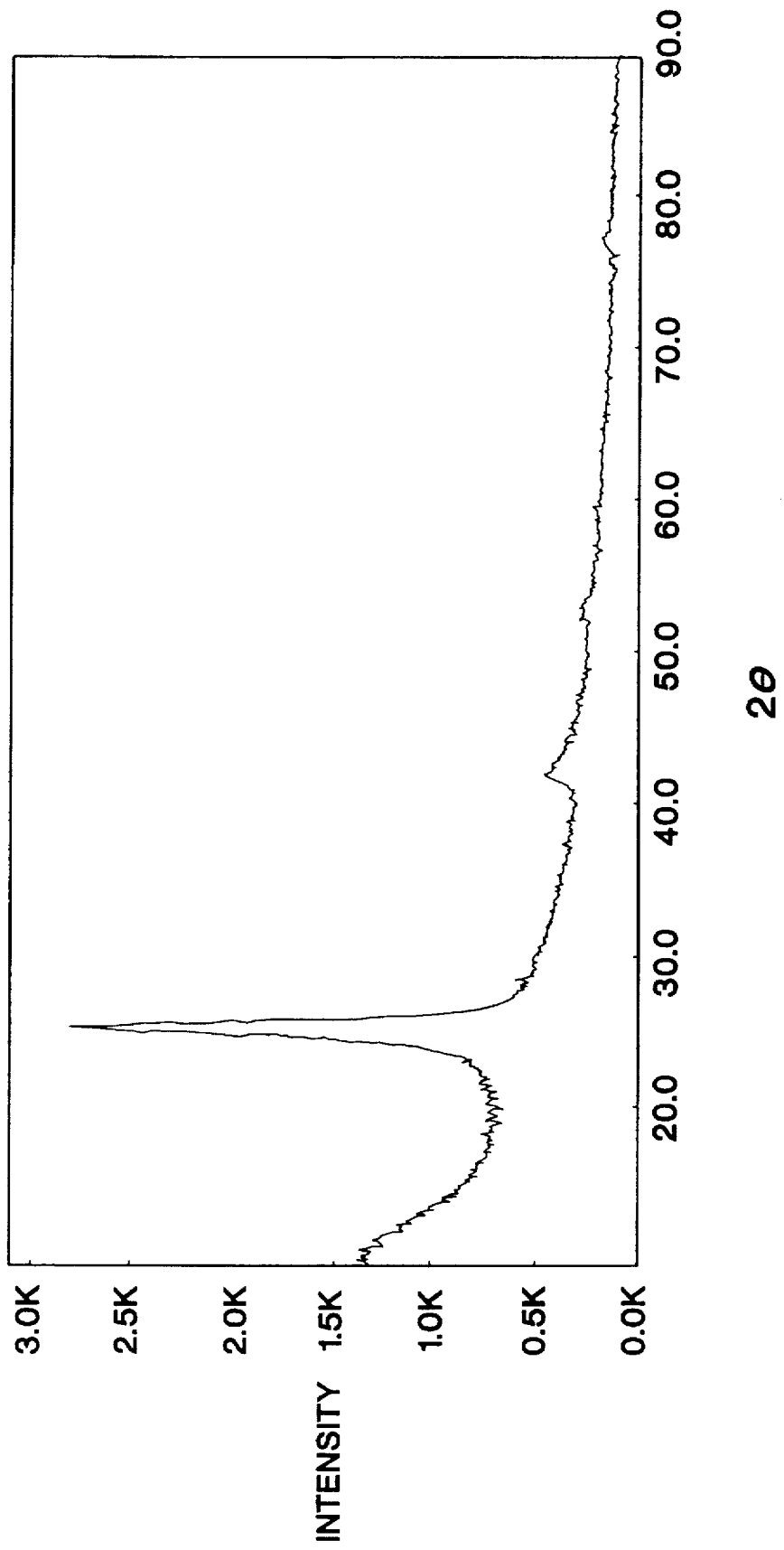
FIG. 21 is an X-ray diffraction pattern of a carbon material obtained in Comparative Example 12.
Figure 22:
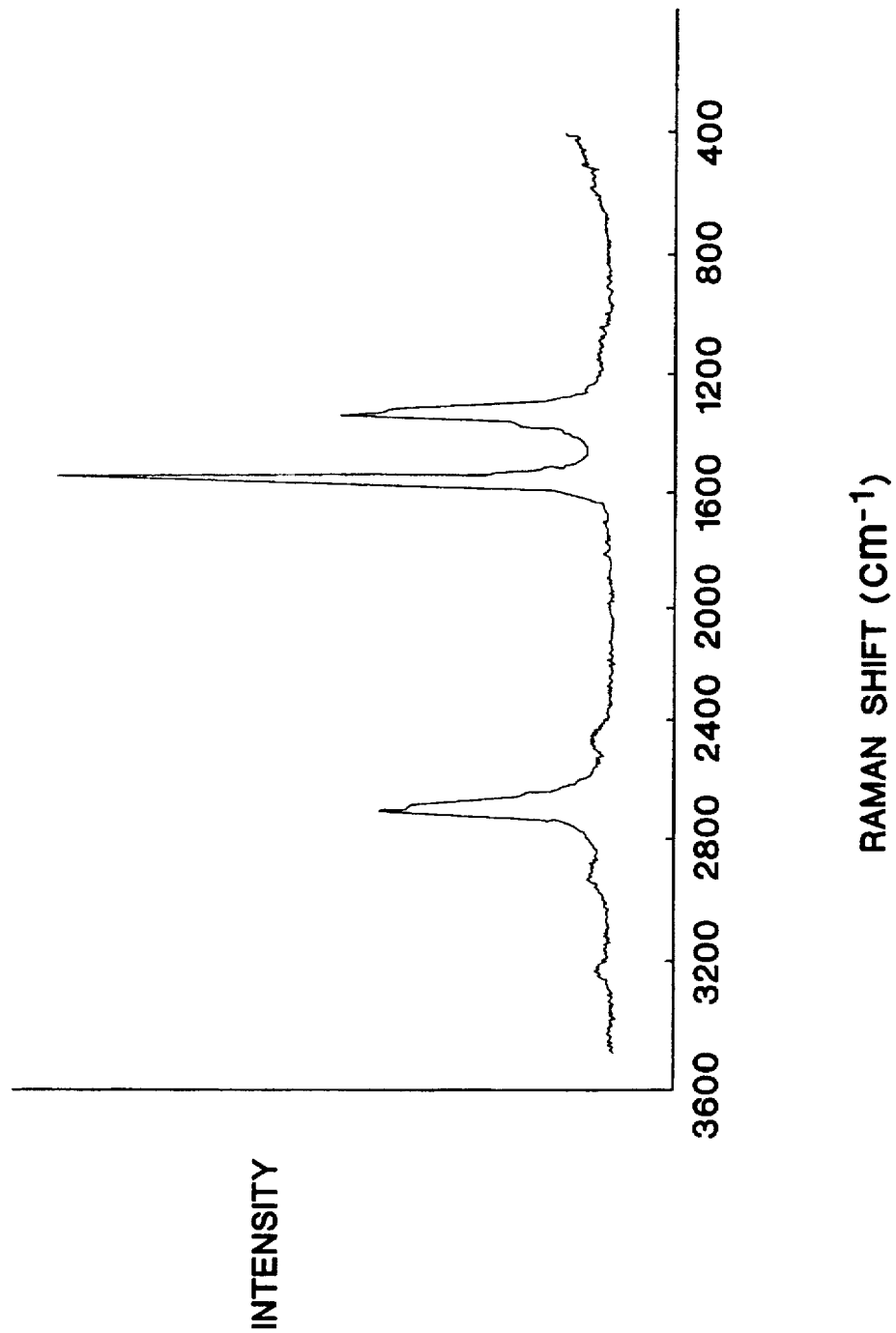
FIG. 22 is a laser Raman spectrogram of a powder obtained in Comparative Example 12.

A powder of a carbon material was obtained in a manner similar to that of Example 7, with the exception that carbon pitch was retained in a stream of a nitrogen gas at 2,300° C. for 2 hours. An X-ray diffraction pattern of the resulting powder is shown in FIG. 21, and results of Raman spectrum analysis using an argon ion laser beam having a wavelength of 5,145 Å are shown in FIG. 22. The hydrogen/carbon (H/C) atomic ratio was measured. As a result, the hydrogen atom was below the limit of detection, and the true density was 2.18 g/cm³.

Figure 23:
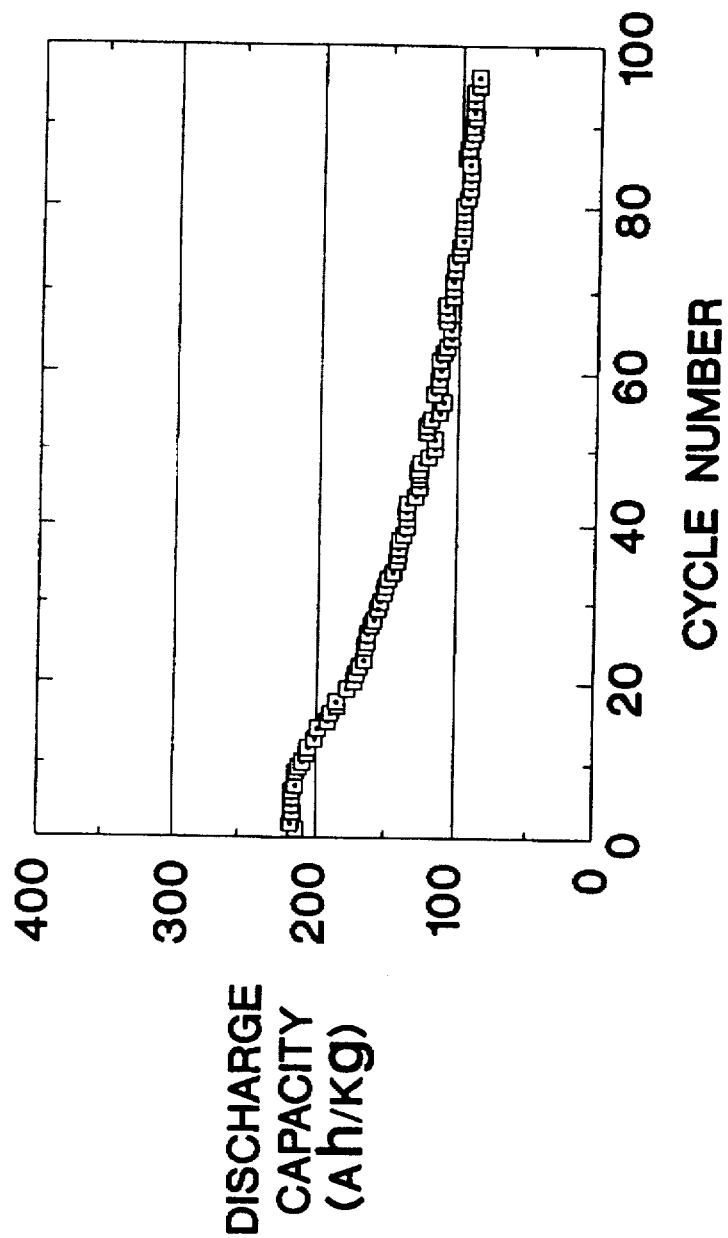
FIG. 23 is a graph showing discharge capacity vs. cycle number in Comparative Example 12.

Using this powder, as with Example 7, an anode was produced and an evaluation cell was assembled to evaluate the cycle stability. The resistivity of this electrode was 6 Ωcm. Results are shown in FIG. 23.

As is apparent from a comparison of FIGS. 17 to 21 and 23, when the carbon materials of the present invention were used in the anodes, the samples were high in capacity, excellent in cycle stability, and also stable in charge and discharge at a high current density.

Example 10

In an argon atmosphere, the temperature of a polymer of benzene/xylene (molar ratio)=1:1 (PBX) was raised from room temperature to 160° C. for one hour, and raised to 680° C. at a rate of 70° C./hour. At the time when the temperature reaches 680° C., heating was stopped, followed by furnace cooling. In this case, argon was continuously allowed to flow until the carbon material reaches room temperature.

Figure 24:
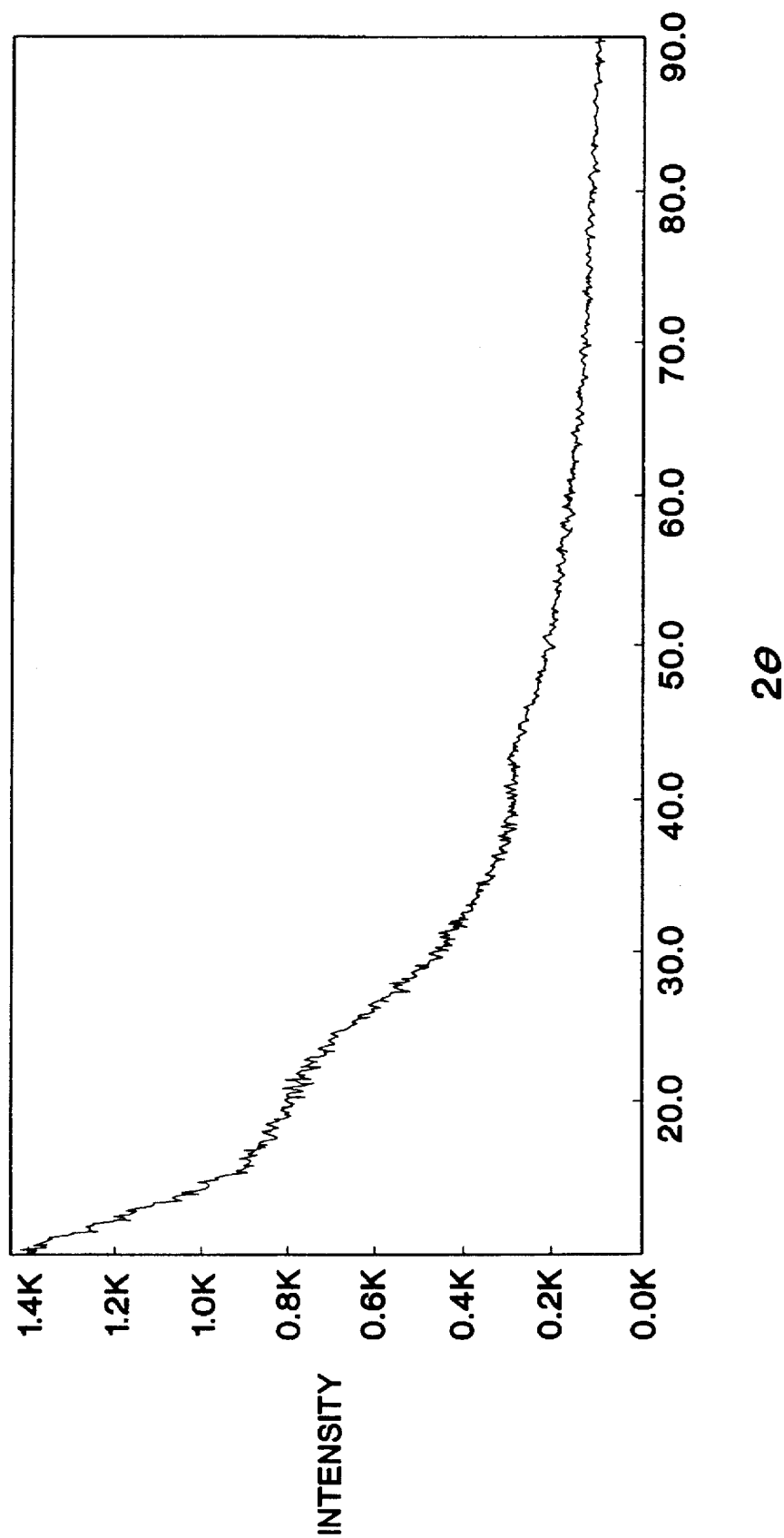
FIG. 24 is an X-ray diffraction pattern of a carbon material obtained in Example 10.
Figure 29:
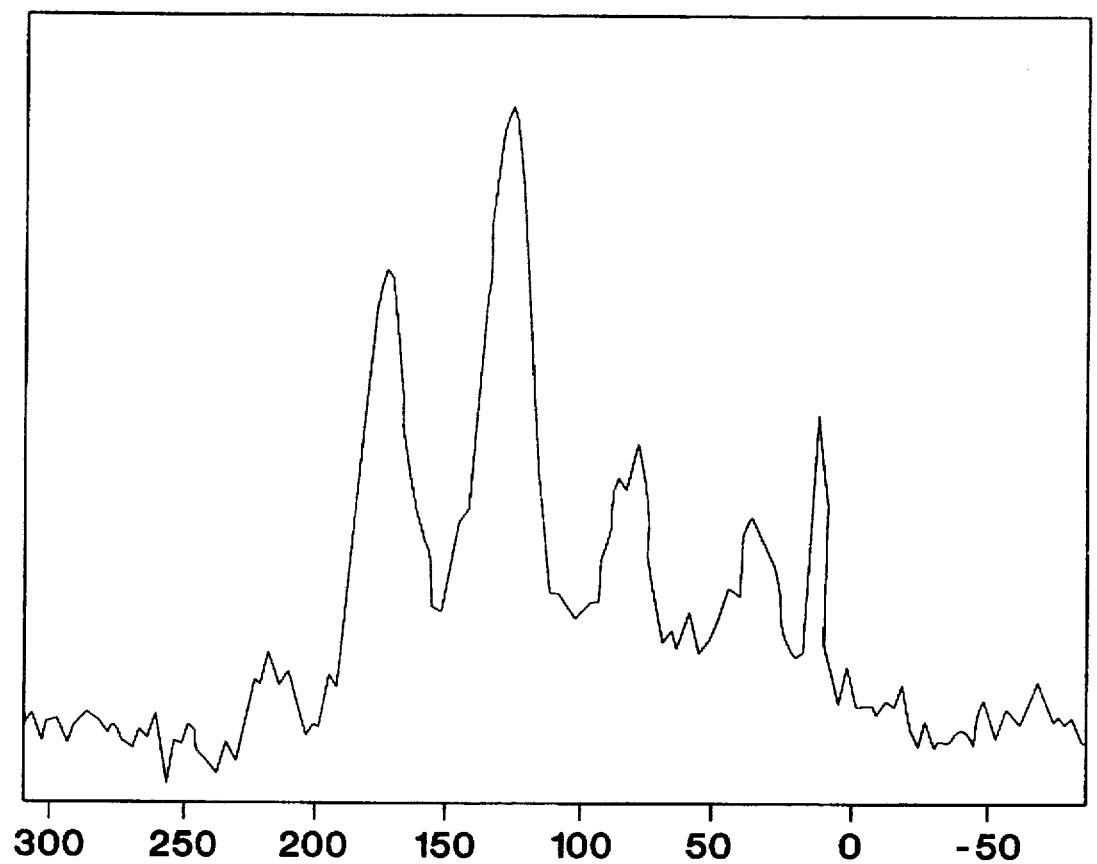
FIG. 29 is an NMR spectrum of the carbon material obtained in Example 12.

An X-ray diffraction pattern of this carbon material is shown in FIG. 24. No clear X-ray diffraction peak is exhibited, and no development of the graphite structure is observed. In Raman spectrum analysis of this carbon material using an argon ion laser beam having a wavelength of 5,145 Å, the peak of 1,580 cm⁻¹ was shifted to the short wavelength side, and no clear peak was exhibited in the vicinity of 2,700 cm⁻¹. The size of a crystallite of a condensed six-membered ring was 25 Å or less. Further, analysis was carried out by NMR. As a result, a peak based on a condensed six-membered ring and a peak based on aliphatic carbon were detected as shown in FIG. 29.

Figure 25:
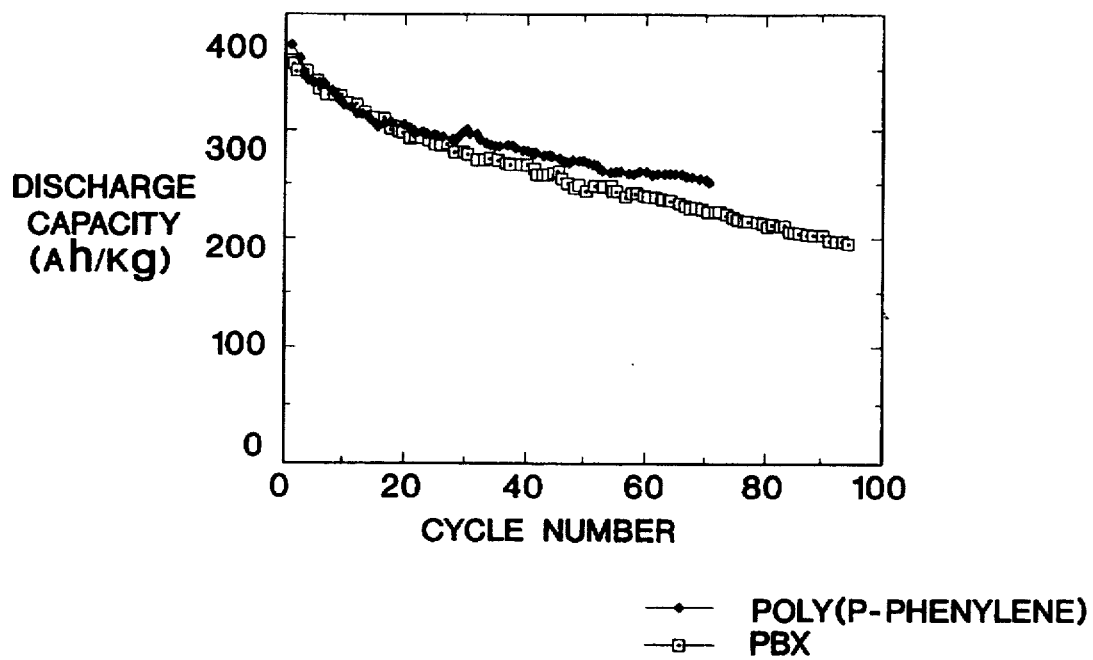
FIG. 25 is a graph showing discharge capacity vs. cycle number in Example 10.

To a powder of this carbon material, 20% by weight of a Teflon binder was added. The mixture was subjected to pressure molding and cut out to 5×6 mm to produce an electrode. This was repeatedly charged and discharged at a charge-discharge current density of 1.6 mA/cm², at a charge termination potential of +10 mV (to Li/Li) and at a discharge termination potential of +3 V. Results thereof are shown in FIG. 25.

A carbon material (the size of a crystallite of a condensed six-membered ring was 25 Å or less) having properties both of an organic substance and carbon obtained by heat treating poly(p-phenylene) in an Ar stream at 700° C., including only a condensed six-membered ring and not combined with aliphatic carbon was similarly formed to an electrode, and the cycle stability was evaluated. Results are shown in FIG. 25. One combined with aliphatic carbon is somewhat superior in performance.

Example 11

Figure 26:
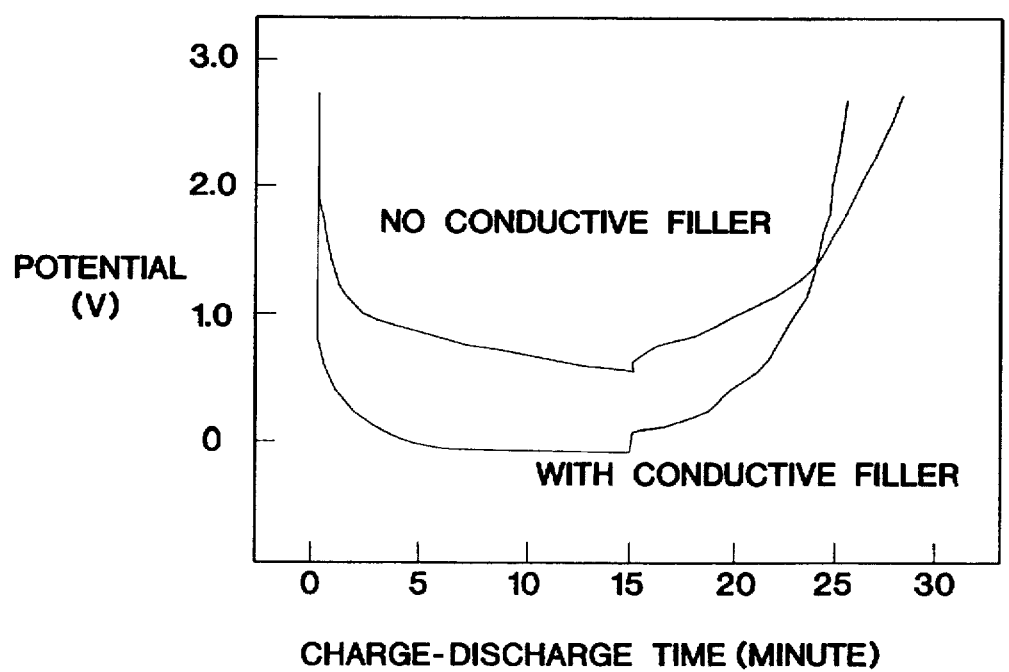
FIG. 26 is a graph showing charge-discharge curves in Example 11.

A powder of a carbon material was obtained in a manner similar to that of Example 3. With 80% by weight of this powder, 10% by weight of a polyethylene powder as a binder and 10% by weight of vapor-phase growth method carbon fibers (manufactured by Showa Denko K. K., graphitization treated product) as a conductive filler were mixed. The mixture was rolled through rollers to about 200 μm. After vacuum drying at 80° C., this was cut out to 5×6 mm. The resistivity of this electrode was 0.5 Ωcm. Using this electrode, according to the evaluation cell shown in FIG. 16, charge was performed at 10 mA/cm², followed by discharge at 10 mA/cm² to examine the charge-discharge characteristics time. Results are shown in FIG. 26 at the same time which were evaluated in a manner similar to that described above, with the exception that 89% by weight of the electrode powder and 11% by weight of the binder were used without addition of the conductive filler. It is known from FIG. 26 that one containing the conductive filler is more excellent in rapid charge.

Example 12

In an argon atmosphere, the temperature of a polymerized resin of benzene/xylene (molar ratio)=1:1 (PBX) was raised from room temperature to 350° C. for one hour, and raised to 650° C. for 6 hours. At the time when the temperature reaches 650° C., heating was stopped, followed by furnace cooling. In this case, argon was continuously allowed to flow until the carbon material reaches room temperature.

Figure 27:
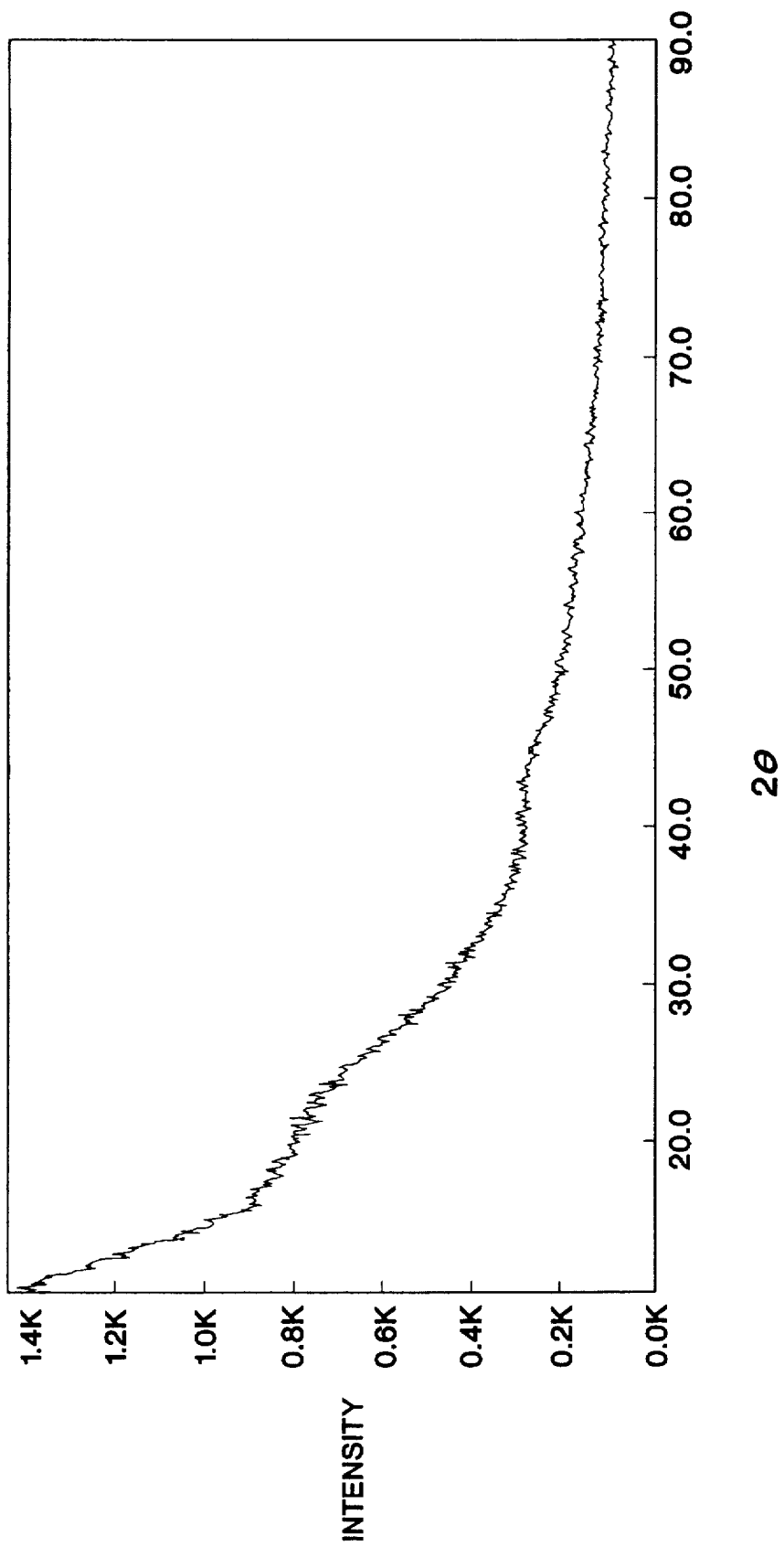
FIG. 27 is an X-ray diffraction pattern of a carbon material obtained in Example 12.
Figure 28:
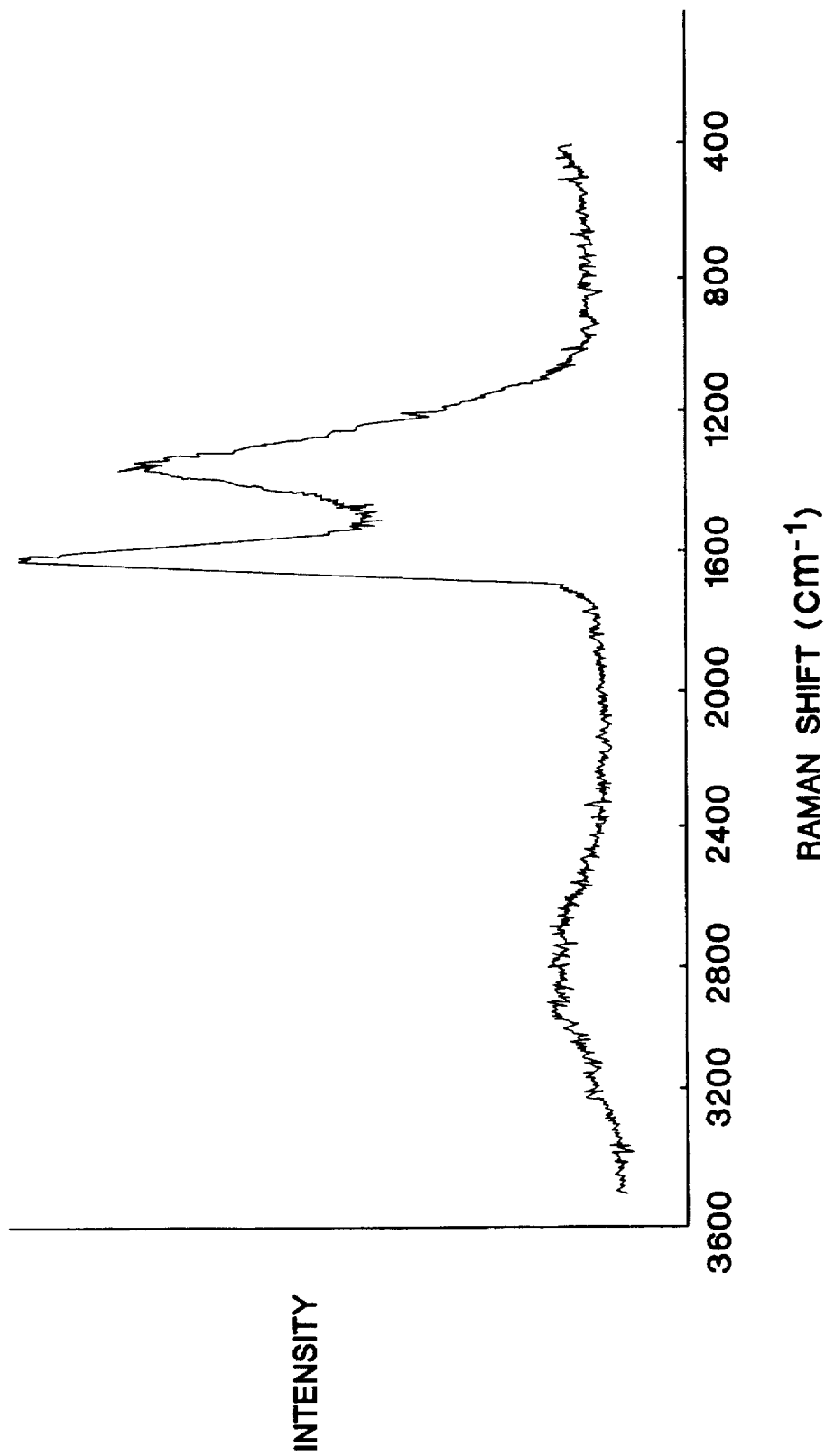
FIG. 28 is a laser Raman spectrogram of the carbon material obtained in Example 12.

An X-ray diffraction pattern of this carbon material is shown in FIG. 27. This carbon material exhibits no clear X-ray diffraction peak and has the amorphous structure. Results of Raman spectrum analysis of this carbon material using an argon ion laser beam having a wavelength of 5,145 Å are shown in FIG. 28. No clear peak was exhibited in the vicinity of 2,700 cm$^{-1}$ and no development of the graphite structure is observed. An NMR spectrum is shown in FIG. 29.

Figure 30:
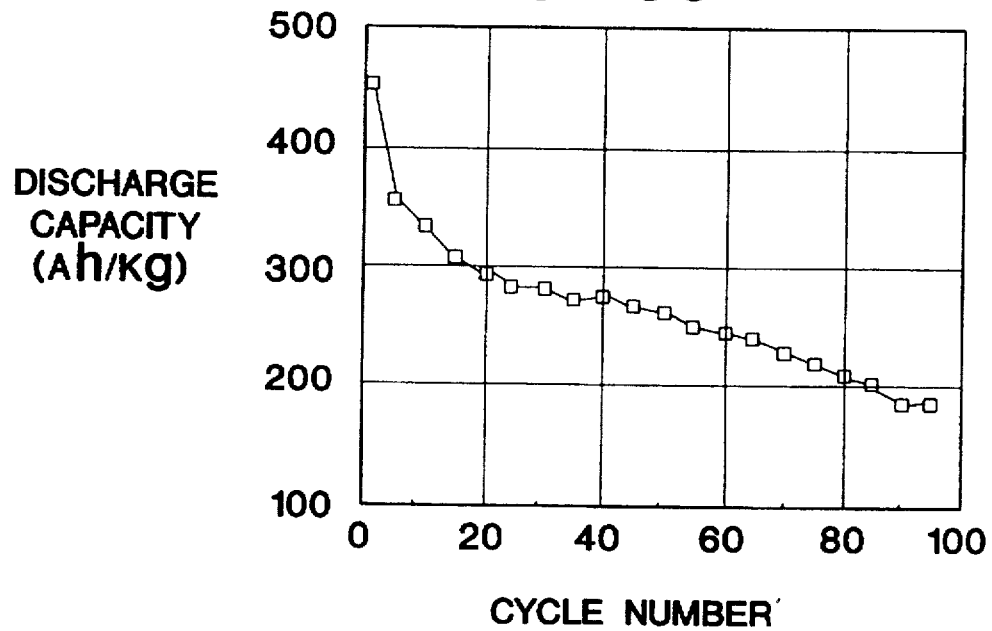
FIG. 30 is a graph showing discharge capacity vs. cycle number in Example 12.

A peak (in the vicinity of 120 to 130 ppm) arising from aromatic cyclocondensation and a peak (in the vicinity of 10 ppm) arising from aliphatic carbon are observed. The atomic ratio was measured. As a result, hydrogen/carbon (H/C) was 0.22. To a powder of this carbon material, 20% by weight of a polyethylene binder was added. The mixture was subjected to pressure molding to produce a cathode. Using this cathode, Li as an anode, and a solution as an electrolyte, in which LiClO$_4$ was dissolved at a concentration of 1 mol/l in a mixed solvent of propylene carbonate and ethylene glycol dimethyl ether in a volume ratio of 1:1, the performance was evaluated. The cycle stability was repeatedly examined at a charge-discharge current density of 1.6 mA/cm$^2$, at a charge termination potential of +10 mV and at a discharge termination potential of +3 V. Results thereof are shown in FIG. 30.

Example 13

Figure 31:
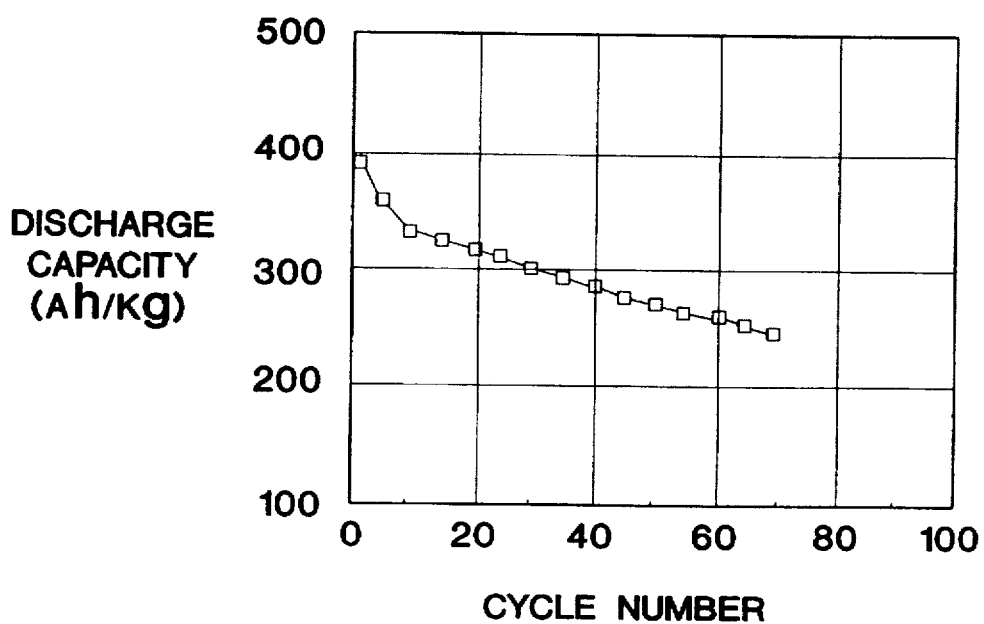
FIG. 31 is a graph showing discharge capacity vs. cycle number in Example 13.

For the powder of the carbon material obtained in Example 7, the performance was evaluated in a manner similar to that of Example 12. The cycle stability is shown in FIG. 31.

INDUSTRIAL APPLICABILITY

By using the carbon materials of the present invention as the electrode materials, the nonaqueous secondary batteries are obtained which have a high capacity, which are excellent in cycle stability upon the charge and discharge, and which can resist the charge and discharge at a high current density. Further, the carbon materials of the present invention are also useful as materials such as semiconductors, capacitors and activated carbon.

Furthermore, the methods for producing the carbon materials of the present invention can be conducted at a low temperature, compared with the conventional producing methods in which treatment must be carried out at a high temperature of 2,000° C. or more.

We claim:

1. A nonaqueous electrolyte secondary battery comprising a primarily amorphous carbon material having a density of 1.3 to 2.1 g/cm$^3$, a hydrogen/carbon (H/C) atomic ratio of 0.15 to 0.40, an amorphous structure, exhibiting peaks in the vicinity of 1350 cm$^{-1}$ and 1600 cm$^{-1}$ and no clear peak in the vicinity of 2700 cm$^{-1}$ in a Raman spectrum analysis using an argon ion laser beam having a wavelength of 5,145 Å, exhibiting a peak in the vicinity of 120 to 130 ppm bs. TMS in NMR analysis and having electrical conductivity, with a resistivity of 10$^{-3}$ to 10$^4$ Ωcm at room temperature, as an electrode material, said carbon material being obtained by heat treating a non-heterocyclic polymer under an inert gas atmosphere at a temperature of 500° to 1,500° C.

2. The nonaqueous electrolyte secondary battery according to claim 1, wherein said battery is a lithium secondary battery.

3. A primarily amorphous carbon material obtained by heat-treating an organic, non-heterocyclic polymer compound under an inert gas atmosphere at a temperature of 500° to 1500° C., wherein said amorphous carbon material (1) has a hydrogen/carbon atomic ratio from 0.15 to 0.40, (2) a density from 1.3 to 2.1 g/cm$^3$, (3) an amorphous structure, (4) exhibits peaks in the vicinity of 1350 cm$^1$ and 1600 cm$^{-1}$ and no clear peak in the vicinity of 2700 cm$^{-1}$ in a Raman spectrum analysis using an argon ion laser beam having a wavelength of 5,145 Å, (5) exhibits a peak in the vicinity of 120 to 130 ppm, in NMR analysis, arising from aromatic cyclocondensation, and (6) has electrical conductivity, with a resistivity of 10$^{-3}$ to 10$^4$ Ωcm at room temperature.

4. The primarily amorphous carbon material described in claim 3, wherein the non-heterocyclic polymer is poly(p-phenylene).

5. A method for producing a primarily amorphous carbon material comprising heat-treating an organic, non-heterocyclic polymer compound, to about the carbonization temperature of said compound, under an inert gas at a temperature increasing from 500° to 1500° C. at a rate of heating within the range of 6° C./hour to 300° C./hour to form a primarily amorphous carbon material having a density from 1.3 to 2.1 g/cm$^3$, a hydrogen/carbon atomic ratio from 0.15 to 0.40, electrical conductivity with a resistivity of 10$^{-3}$ to 10$^4$ Ωcm at room temperature and which exhibits peaks in the vicinity of 1350 cm$^{-1}$ and 1600 cm$^{-1}$ and no clear peak in the vicinity of 2700 cm$^{-1}$ in a Raman spectrum analysis using an argon ion laser beam having a wavelength of 5,145 Å, and peaks in the vicinity of 120 to 130 ppm, in NMR analysis, arising from aromatic cyclocondensation.

6. The method for producing the primarily amorphous carbon material described in claim 5, wherein the non-heterocyclic polymer is poly(p-phenylene).

* * * * *

UNITED STATES PATENT AND TRADEMARK OFFICE
CERTIFICATE OF CORRECTION

PATENT NO. : 5,591,545
DATED : January 7, 1997
INVENTOR(S) : K. Miyashita, et. al.

It is certified that error appears in the above-indentified patent and that said Letters Patent is hereby corrected as shown below:

Title page, item [63] should read as following:

-- [63] Continuation of Ser. No. 75,455, filed June 18, 1993, which was the national stage international number PCT/JP92/01475 November 11, 1992, published as WO93/10566 May 21, 1993, abandoned. --

Signed and Sealed this

Twenty-sixth Day of August, 1997

*Attest:*

BRUCE LEHMAN

*Attesting Officer*     *Commissioner of Patents and Trademarks*